United States Patent
Matsumoto

(10) Patent No.: US 12,384,227 B2
(45) Date of Patent: Aug. 12, 2025

(54) VEHICLE AIR CONDITIONING SYSTEM

(71) Applicant: Honda Motor Co., Ltd., Tokyo (JP)

(72) Inventor: Subaru Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 18/350,772

(22) Filed: Jul. 12, 2023

(65) Prior Publication Data

US 2024/0123798 A1 Apr. 18, 2024

(30) Foreign Application Priority Data

Oct. 14, 2022 (CN) .......................... 202211259416.6

(51) Int. Cl.
*B60H 3/02* (2006.01)
*B60H 1/00* (2006.01)

(52) U.S. Cl.
CPC ......... *B60H 3/024* (2013.01); *B60H 1/00464* (2013.01); *B60H 1/00828* (2013.01)

(58) Field of Classification Search
CPC ............................ B60H 3/024; B60H 1/00464; B60H 1/00828; B60H 1/00007; B60H 1/00507; B60H 2001/00092
See application file for complete search history.

(56) References Cited

U.S. PATENT DOCUMENTS

| | | | | |
|---|---|---|---|---|
| 2014/0338883 | A1* | 11/2014 | Watanabe | B60H 3/024 165/59 |
| 2018/0105021 | A1* | 4/2018 | Tsunoda | B60H 1/00921 |

FOREIGN PATENT DOCUMENTS

| | | | | |
|---|---|---|---|---|
| JP | 4567478 | | 10/2010 | |
| JP | 2016064695 | | 4/2016 | |
| JP | 2016135653 | A * | 7/2016 | |
| KR | 20110011100 | A * | 2/2011 | ........... B60H 1/3207 |
| WO | WO-2014002377 | A1 * | 1/2014 | ......... B60H 1/00392 |
| WO | WO-2014024332 | A1 * | 2/2014 | ......... B01D 53/0407 |

* cited by examiner

*Primary Examiner* — Emmanuel E Duke
(74) *Attorney, Agent, or Firm* — JCIPRNET

(57) ABSTRACT

A vehicle air conditioning system, having a simple structure and preferable reliability, and capable of suppressing increases in energy consumption and cost, is provided. The vehicle air conditioning system includes: an air conditioning unit, configured to adjust a temperature in a vehicle compartment and including a blower and a temperature control module; and a dehumidification device, configured to adjust a humidity in the vehicle compartment, disposed between the blower and an evaporator of the temperature control module, and enabling a part of air conditioning air flowing in from the blower to flow into the dehumidification device.

30 Claims, 26 Drawing Sheets

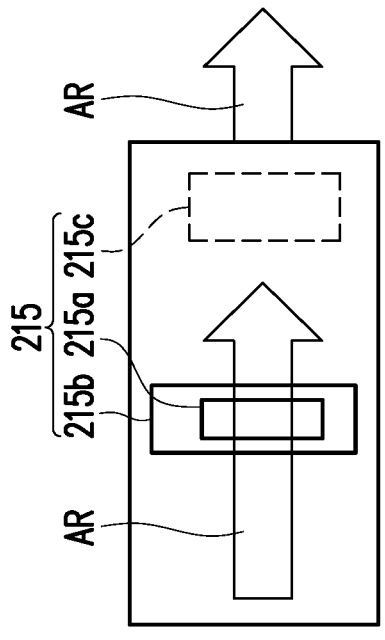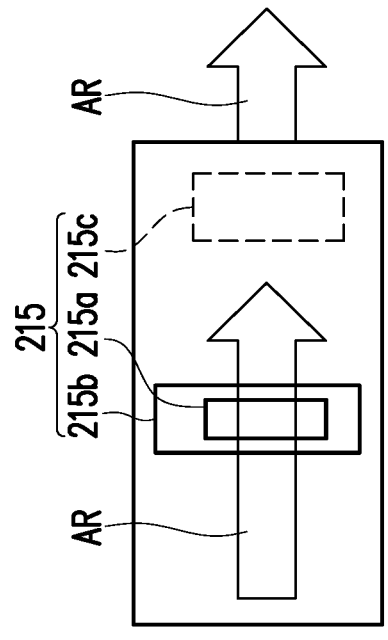
FIG. 1B
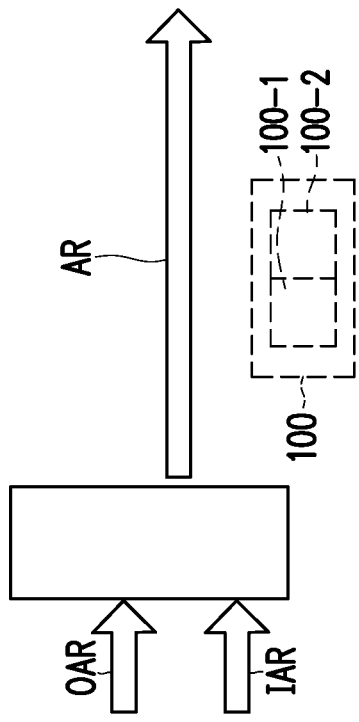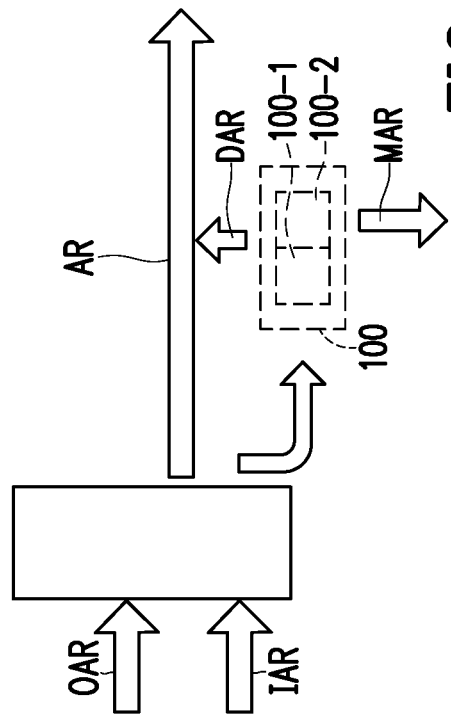
FIG. 1C

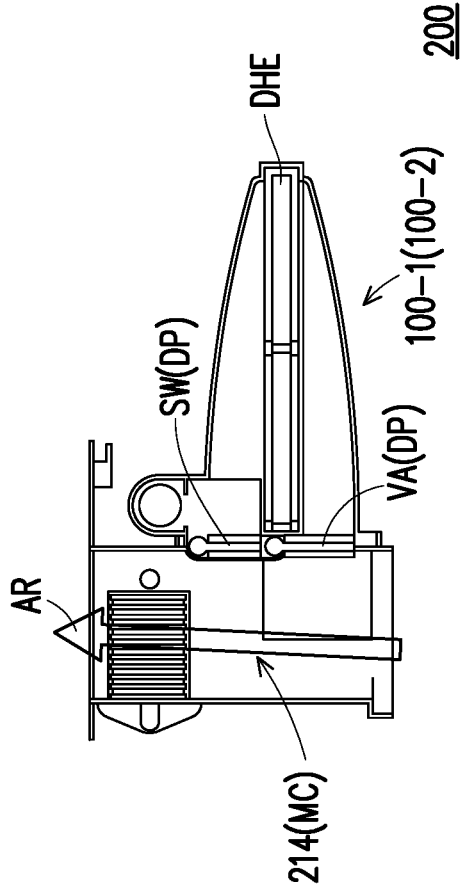
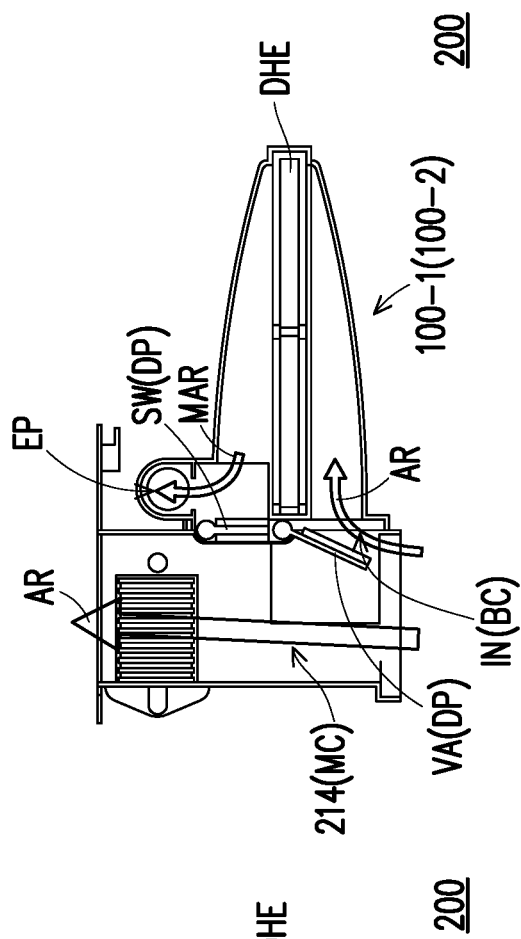
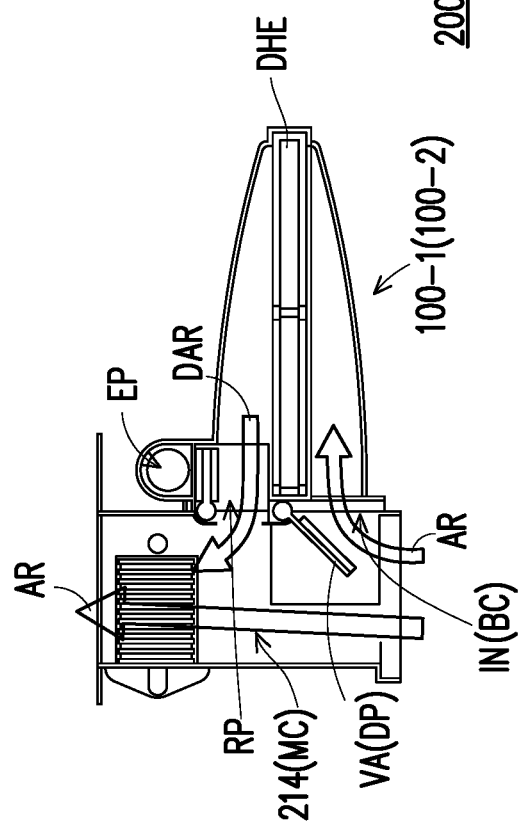

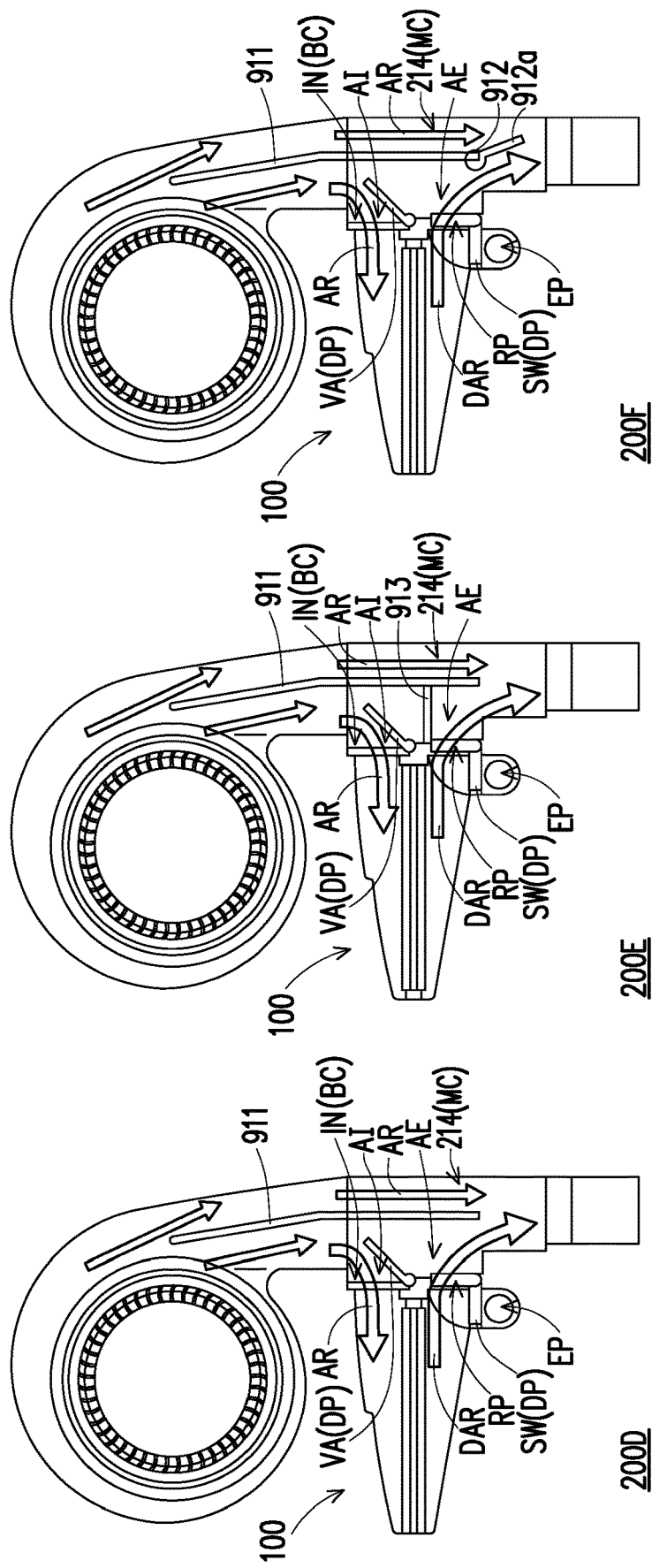

VEHICLE AIR CONDITIONING SYSTEM

CROSS-REFERENCE TO RELATED APPLICATION

This application claims the priority benefit of China application serial no. 202211259416.6, filed on Oct. 14, 2022. The entirety of the above-mentioned patent application is hereby incorporated by reference herein and made a part of this specification.

BACKGROUND

Technical Field

The disclosure relates to a vehicle air conditioning system.

Description of Related Art

The dehumidification device may absorb air in a vehicle for dehumidification to control the humidity in the vehicle. However, in the case where an independent dehumidification device is disposed, the number of required components in the vehicle is increased, and the configuration of the three types of air duct systems of air intake, dehumidified air, and humidified exhaust of the dehumidification device also affects the element layout of other systems in the vehicle. Therefore, it is necessary to integrate the dehumidification device and other systems into an integrated system component for installation.

On the other hand, the vehicle air conditioning system is an essential device for a vehicle with a closed vehicle compartment structure and may be used to adjust the ambient temperature in the vehicle compartment, such as providing cool or warm vehicle compartment temperature. When the dehumidification device is disposed in the vehicle air conditioning system, if air from an air inlet (including an external air inlet and an internal air inlet) of the vehicle air conditioning system passes through the dehumidification device, the external air may contain water droplets, causing a risk of deterioration of the membrane elements of the dehumidification device, so it is necessary to adopt countermeasures that are water repellent.

SUMMARY

The disclosure provides a vehicle air conditioning system, which includes: an air conditioning unit, configured to adjust a temperature in a vehicle compartment and including a blower and a temperature control module; and a dehumidification device, configured to adjust a humidity in the vehicle compartment, disposed between the blower and an evaporator of the temperature control module, and enabling a part of air conditioning air flowing in from the blower to flow into the dehumidification device.

BRIEF DESCRIPTION OF THE DRAWINGS

FIG. 1B is a schematic view of an air flow situation of the vehicle air conditioning system of FIG. 1A in a cooling mode.

FIG. 1C is a schematic view of an air flow situation of the vehicle air conditioning system of FIG. 1A in a warming mode.

FIG. 4A to FIG. 4C are schematic cross-sectional views of the dehumidification device of FIG. 3A in different operating modes.

FIG. 9A to FIG. 9E are schematic cross-sectional views of different vehicle air conditioning systems of FIG. 1A.

DESCRIPTION OF THE EMBODIMENTS

Figure 1A:
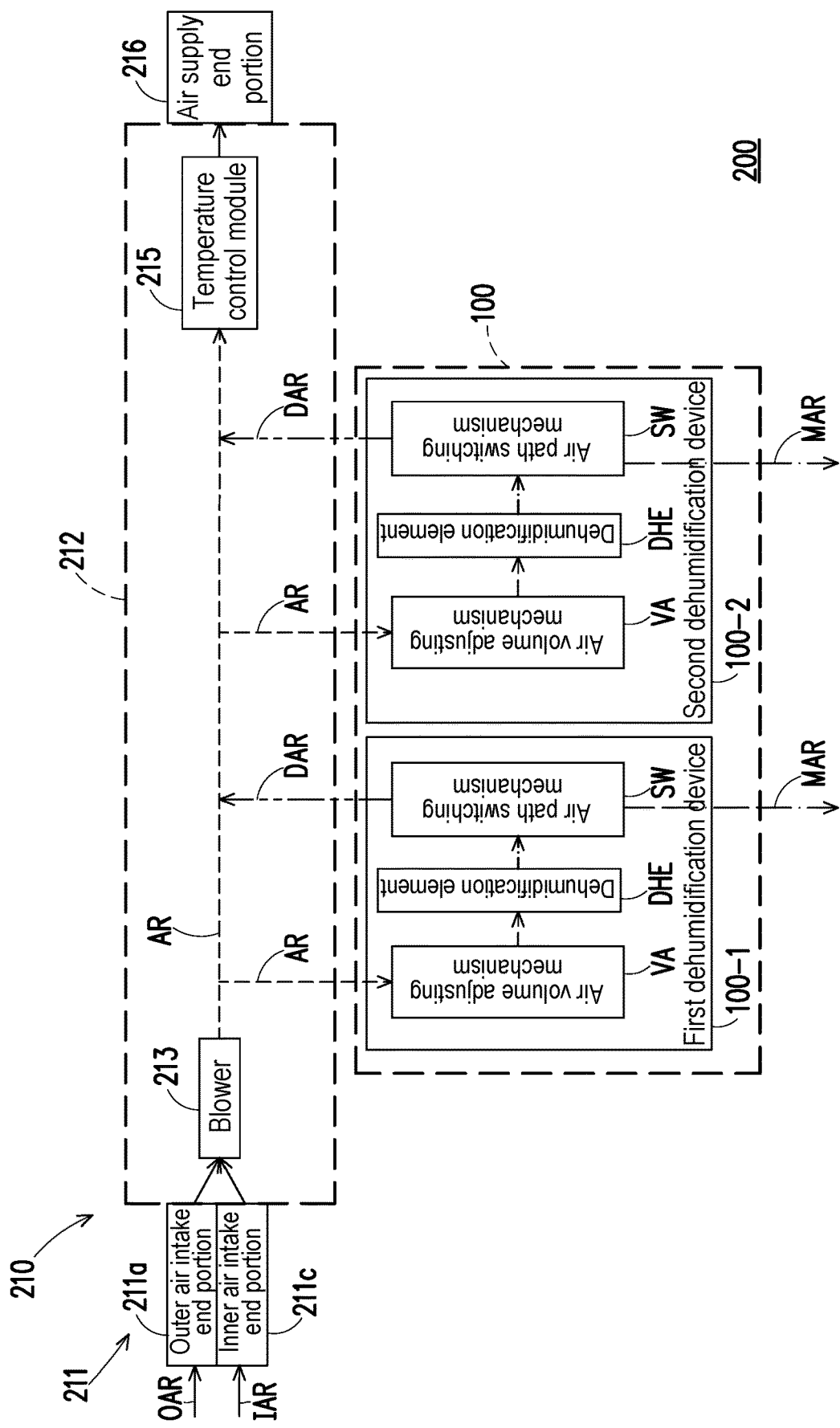
FIG. 1A is a block diagram of a vehicle air conditioning system according to an embodiment of the disclosure.

The disclosure provides a vehicle air conditioning system, which has a simple structure and preferable reliability, and can suppress increases in energy consumption and cost.

The disclosure provides a vehicle air conditioning system, which includes: an air conditioning unit, configured to adjust a temperature in a vehicle compartment and including a blower and a temperature control module; and a dehumidification device, configured to adjust a humidity in the vehicle compartment, disposed between the blower and an evaporator of the temperature control module, and enabling a part of air conditioning air flowing in from the blower to flow into the dehumidification device.

In an embodiment of the disclosure, the air conditioning unit further includes a main flow channel and a branch flow channel, the main flow channel is communicated with an air intake end portion and an air supply end portion of the air conditioning unit and is used for the air conditioning air flowing in from the blower to flow to the temperature control module, and the branch flow channel diverges from the main flow channel, is communicated with the main flow channel and the dehumidification device, and is used for the part of the air conditioning air flowing in from the blower to flow into the dehumidification device.

In an embodiment of the disclosure, an air volume of the part of the air conditioning air flowing from the branch flow path into the dehumidification device is less than or equal to an air volume of another part of air conditioning air that does not flow into the dehumidification device in the main flow path.

In an embodiment of the disclosure, the dehumidification device includes: an air volume adjusting mechanism, used to form one of an air inflow channel and an air discharge channel, wherein the air inflow channel is communicated with the branch flow channel; an air path switching mechanism, used to form other one of the air inflow channel and the air discharge channel; a dehumidification element, disposed on a flow path of the part of the air conditioning air flowing in from the blower between the air volume adjusting mechanism and the air path switching mechanism.

In an embodiment of the disclosure, the dehumidification device is disposed on a connection channel connecting the blower of the air conditioning unit and the temperature control module.

In an embodiment of the disclosure, the air volume adjusting mechanism is used to form the air inflow channel, the air path switching mechanism is used to form the air discharge channel, and the air path switching mechanism switches the air discharge channel between a return air path and a discharge air path, wherein the return air path is an air path for returning dehumidified dried air conditioning air back to the main flow path of the air conditioning unit, and the discharge air path is an air path for discharging humidified air generated by heating the dehumidification device to an outside of a vehicle.

In an embodiment of the disclosure, the connection channel is formed as a part of the main flow channel, the branch flow channel is communicated with the connection channel, the air volume adjusting mechanism includes a damper structure configured to adjust a degree of opening, the degree of opening of the damper structure is used to form and adjust a size of an adjustable cross-sectional area of an inflow pathway of the branch flow channel, and the adjustable cross-sectional area of the inflow pathway of the branch flow channel is less than or equal to half of a cross-sectional area of the connection channel.

In an embodiment of the disclosure, the dehumidification device installed in the connection channel is installed on a side of a housing peripheral wall opposite to an air supply port of the blower for connecting the main flow channel in a centrifugal direction.

In an embodiment of the disclosure, the dehumidification element has a moisture-absorbing surface, and the moisture-absorbing surface is disposed parallel to a gravitational direction and perpendicular to a front side direction of a vehicle.

In an embodiment of the disclosure, the dehumidification element has a moisture-absorbing surface, the moisture-absorbing surface is disposed to be inclined relative to a gravitational direction and a front side direction of a vehicle, and the moisture-absorbing surface faces diagonally below a vehicle front side.

In an embodiment of the disclosure, the air volume adjusting mechanism and the air path switching mechanism both include a damper structure configured to adjust a degree of opening, and the dehumidification device further includes: an actuator; and a connection mechanism, wherein the actuator connects the air volume adjusting mechanism and the air path switching mechanism through connection mechanism to control the degrees of opening of the damper structures of the air volume adjusting mechanism and the air path switching mechanism.

In an embodiment of the disclosure, the degrees of opening of the damper structures of the air volume adjusting mechanism and the air path switching mechanism are linked through the connection mechanism.

In an embodiment of the disclosure, the vehicle air conditioning system further includes a partition. The partition is disposed in the main flow channel and is used to divert the part of the air conditioning air in the main flow channel to the branch flow channel.

In an embodiment of the disclosure, the partition faces an air inlet of the dehumidification device, and the partition extends from an end of the air inlet of the dehumidification device to other end of the air inlet of the dehumidification device.

In an embodiment of the disclosure, the partition faces an air inlet and an exhaust port of the dehumidification device, and the partition extends from an end of the air inlet of the dehumidification device to an end of the exhaust port of the dehumidification device away from the air inlet.

In an embodiment of the disclosure, the partition faces an air inlet and an exhaust port of the dehumidification device, and the partition extends from an upstream side of an air supply port of the blower for connecting the main flow channel to an end of the exhaust port of the dehumidification device away from the air inlet.

In an embodiment of the disclosure, the vehicle air conditioning system further includes a windproof plate. The windproof plate is disposed in the main flow channel and is connected to the partition, and is used to separate the air inflow channel and the air discharge channel.

In an embodiment of the disclosure, the vehicle air conditioning system further includes a main flow air volume distribution mechanism. The main flow air volume distribution mechanism is disposed in the main flow channel and is used to control an air volume of air conditioning air in the main flow channel.

In an embodiment of the disclosure, the main flow air volume distribution mechanism is located on a connection portion of an air supply port of the blower for connecting the main flow channel and the connection channel, and extends toward an upstream side of the air supply port of the blower.

In an embodiment of the disclosure, the main flow air volume distribution mechanism is located on a flow path of dehumidified dried air conditioning air flowing from an exhaust port of the dehumidification device to the temperature control module, and the dehumidified air conditioning air merges with another part of air conditioning air that does not flow into the dehumidification device in the main flow channel after passing through the main flow air volume distribution mechanism.

In an embodiment of the disclosure, the dehumidification device is disposed in front of the evaporator and is configured in the temperature control module.

In an embodiment of the disclosure, the air conditioning unit has a drain port for discharging condensed water generated in the evaporator to an outside of a vehicle, and heated humidified air in the dehumidification device is discharged out of the vehicle through the drain port and shares a same path with a discharge of the condensed water generated in the evaporator.

In an embodiment of the disclosure, the air volume adjusting mechanism is used to form the air inflow channel, the air path switching mechanism is used to form the air discharge channel, and the air path switching mechanism switches the air discharge channel between a return air path and a discharge air path, wherein the return air path is an air path for returning dehumidified dried air conditioning air back to the main flow path of the air conditioning unit, and the discharge air path is an air path for discharging humidified air generated by heating the dehumidification device to an outside of a vehicle.

In an embodiment of the disclosure, the air path switching mechanism is used to open and close a communication port of the branch flow path, so that a part of air conditioning air flowing in from the blower flows into an air inlet of the dehumidification device to switch between the air volume adjusting mechanism and the air path switching mechanism, wherein when the dehumidification device executes dehumidification, the air path switching mechanism is used to form the air inflow channel, and the air volume adjusting mechanism is used to form the air discharge channel, and when the dehumidification device executes regeneration, the air volume adjusting mechanism is used to form the air inflow channel, and the air path switching mechanism is used to form the air discharge channel.

In an embodiment of the disclosure, there are multiple dehumidification devices, which include a first dehumidification device and a second dehumidification device, wherein when dehumidification is performed through a dehumidification element of one of the first dehumidification device and the second dehumidification device, other one of the first dehumidification device and the second dehumidification device heats the dehumidification element of the other one to regenerate the other one of the first dehumidification device and the second dehumidification device.

In an embodiment of the disclosure, the dehumidification device alternately switches a cycle time of dehumidification or regeneration of the first dehumidification device and the second dehumidification device in batches based on information of a temperature and humidity sensor disposed on the air inflow channel or the air discharge channel of at least any one of the first dehumidification device and the second dehumidification device.

In an embodiment of the disclosure, the first dehumidification device and the second dehumidification device alternately switch to execute a dehumidification or regeneration process at a predetermined time interval.

In an embodiment of the disclosure, the air volume adjusting mechanism of any one of the first dehumidification device and the second dehumidification device is used to form the air inflow channel, includes a damper structure configured to adjust a degree of opening, and is used to adjust an air volume of the part of the air conditioning air flowing into the air inflow channel of the any one, the air path switching mechanism is used to form the air discharge channel, and the air path switching mechanism switches the air discharge channel between a return air path and a discharge air path, wherein the return air path is an air path for returning dehumidified dried air conditioning air back to the main flow path of the air conditioning unit, and the discharge air path is an air path for discharging humidified air generated by heating the dehumidification device to an outside of a vehicle. When dehumidification is performed through the first dehumidification device, the degree of opening of the damper structure of the first dehumidification device is greater than the degree of opening of the damper structure of the second dehumidification device, the air path switching mechanism of the first dehumidification device switches the air discharge channel of the first dehumidification device to the return air path of the first dehumidification device, and the air path switching mechanism of the second dehumidification device switches the air discharge channel of the second dehumidification device to the discharge air path of the second dehumidification device. When dehumidification is performed through the second dehumidification device, the degree of opening of the damper structure of the second dehumidification device is greater than the degree of opening of the damper structure of the first dehumidification device, the air path switching mechanism of the second dehumidification device switches the air discharge channel of the second dehumidification device to the return air path of the second dehumidification device, and the air path switching mechanism of the first dehumidification device switches the air discharge channel of the first dehumidification device to the discharge air path of the first dehumidification device.

In an embodiment of the disclosure, the air volume adjusting mechanism of any one of the first dehumidification device and the second dehumidification device includes a damper structure configured to adjust a degree of opening, and the air path switching mechanism is used to open and close a communication port of the branch flow channel, so that a part of air conditioning air flowing in from the blower flows into an air inlet of the dehumidification device to switch between the air volume adjusting mechanism and the air path switching mechanism of the any one, wherein when the first dehumidification device executes dehumidification, the air path switching mechanism of the first dehumidification device is used to form the air inflow channel of the first dehumidification device, the air volume adjusting mechanism of the first dehumidification device is used to form the air discharge channel of the first dehumidification device, the air volume adjusting mechanism of the second dehumidification device is used to form the air inflow channel of the second dehumidification device, the air path switching mechanism of the second dehumidification device is used to form the air discharge channel of the second dehumidification device, and the degree of opening of the damper structure of the first dehumidification device is greater than the degree of opening of the damper structure of the second dehumidification device, and when the second dehumidification device executes dehumidification, the air path switching mechanism of the second dehumidification device is used to form the air inflow channel of the second dehumidification device, the air volume adjusting mechanism of the second dehumidification device is used to form the air discharge channel of the second dehumidification device, the air volume adjusting mechanism of the first dehumidification device is used to form the air inflow channel of the first dehumidification device, the air path switching mechanism of the first dehumidification device is used to form the air discharge channel of the first dehumidification device, and the degree of opening of the damper structure of the second dehumidification device is greater than the degree of opening of the damper structure of the first dehumidification device.

In an embodiment of the disclosure, the dehumidification device has a built-in heater configured to directly heat through energization.

Based on the above, in the vehicle air conditioning system according to an embodiment of the disclosure, the dehumidification device may be integrated in the vehicle air conditioning system as the humidity adjustment unit through sharing the structures of the blower and the housing with the vehicle air conditioning system, and through sharing the configuration of the air flow channel of the vehicle air conditioning system, increases in ventilation resistance can be suppressed and increases in power consumption of the blower can be suppressed. At the same time, through simplifying necessary components of the vehicle air conditioning system, even lower power consumption can be ensured while suppressing increases in cost. Also, through disposing the dehumidification device on the side of the housing peripheral wall opposite to the air supply port of the blower for connecting the main flow channel in the centrifugal direction and configuring the moisture-absorbing surface of the dehumidification element of the dehumidification device to be parallel to the gravitational direction or facing diagonally below the vehicle front side and inclined relative to the gravitational direction, the impact caused by external water splashing or water droplets staying on the dehumidification element can be prevented, thereby reducing the risk of deterioration of elements of the dehumidification device, so as to have preferable reliability.

Figure 2:
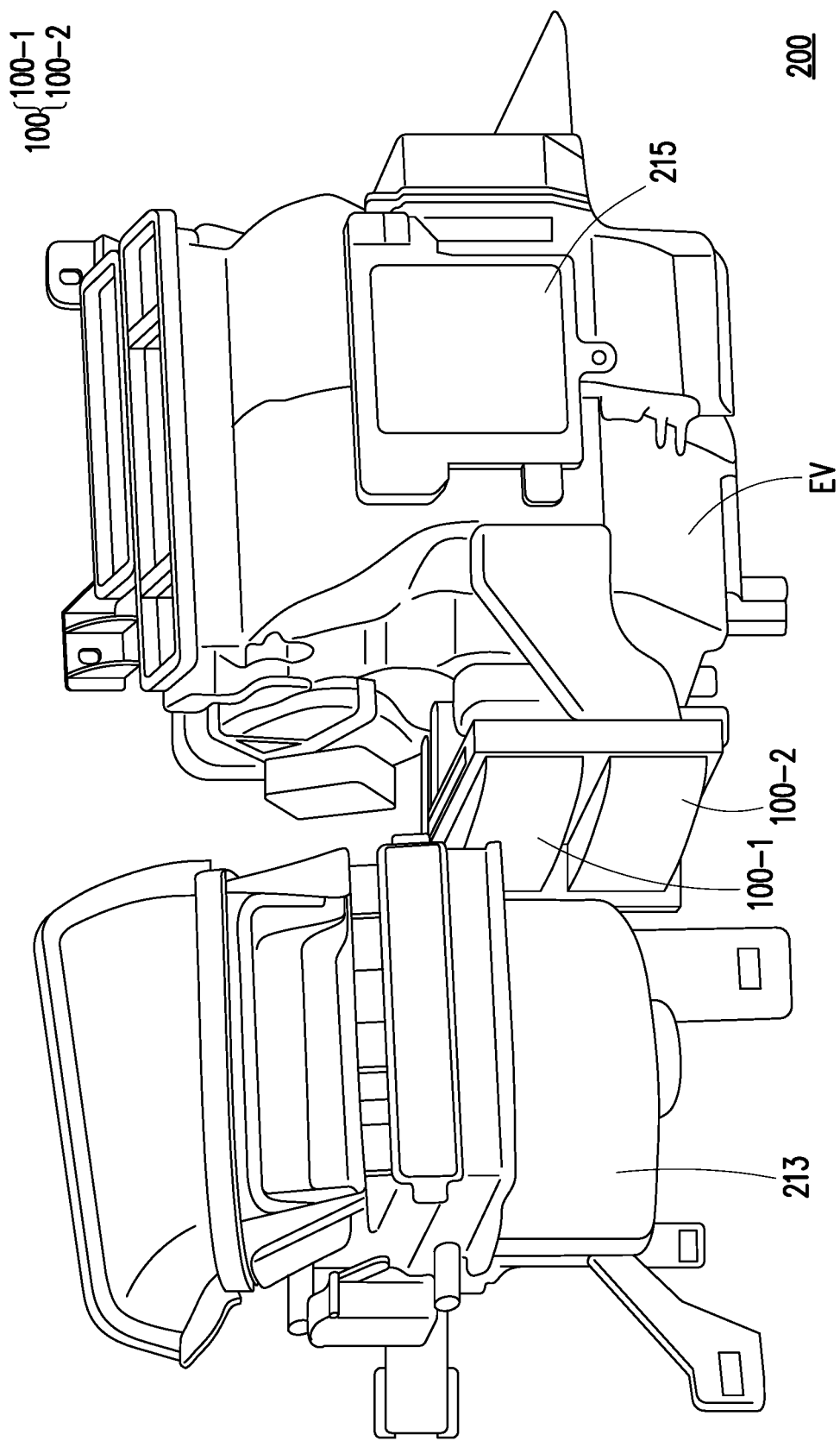
FIG. 2 is a schematic structural view of the vehicle air conditioning system of FIG. 1A.
Figure 3A:
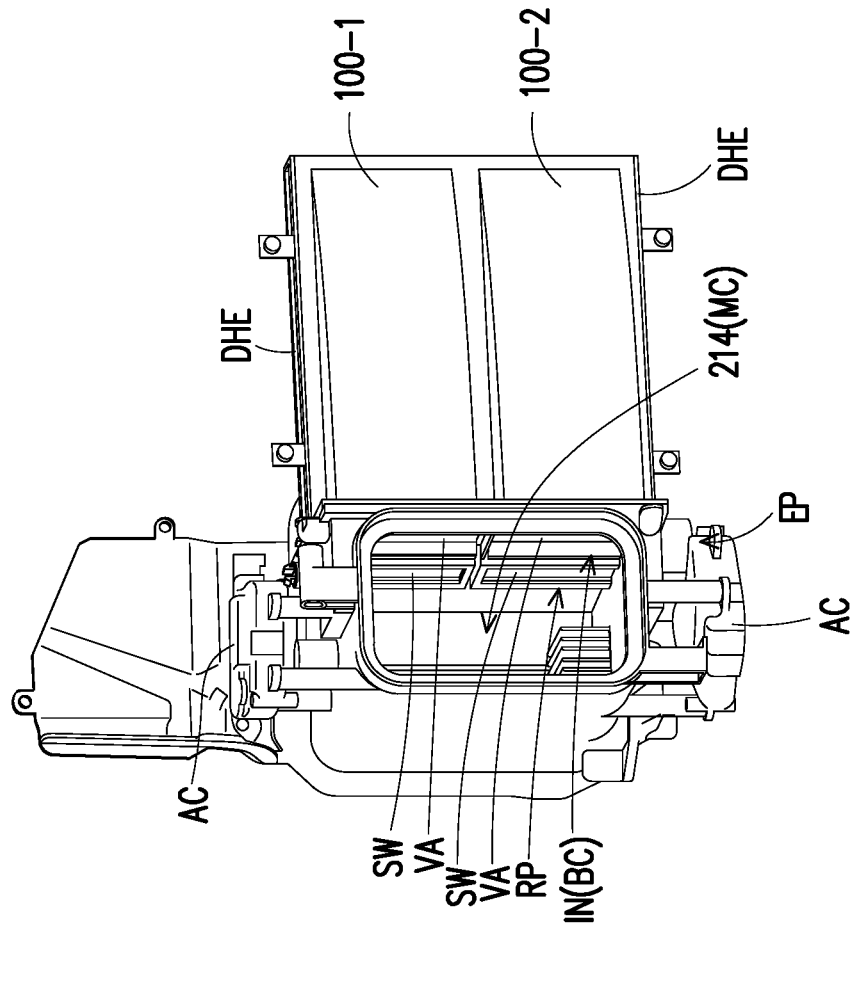
FIG. 3A is a schematic structural view of a dehumidification device of the vehicle air conditioning system of FIG. 2.
Figure 3B:
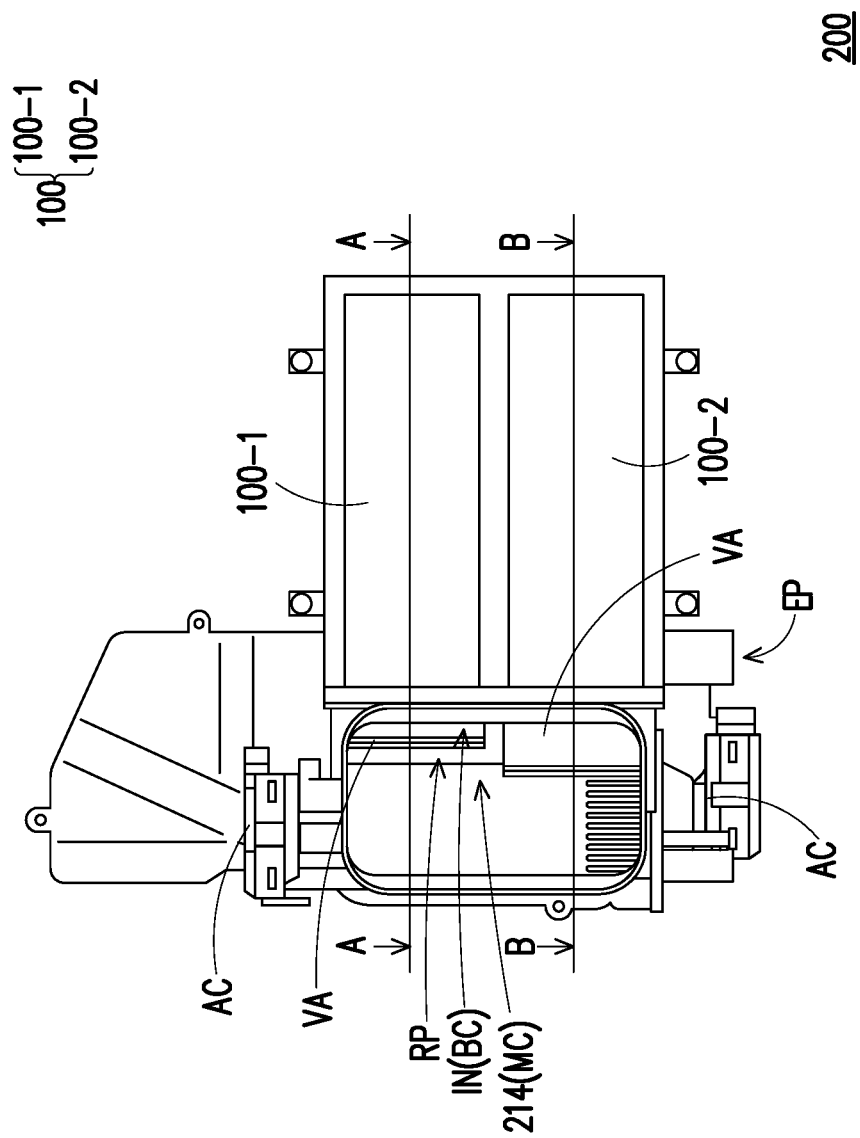
FIG. 3B is a schematic side view of the dehumidification device of FIG. 3A.
Figure 3C:
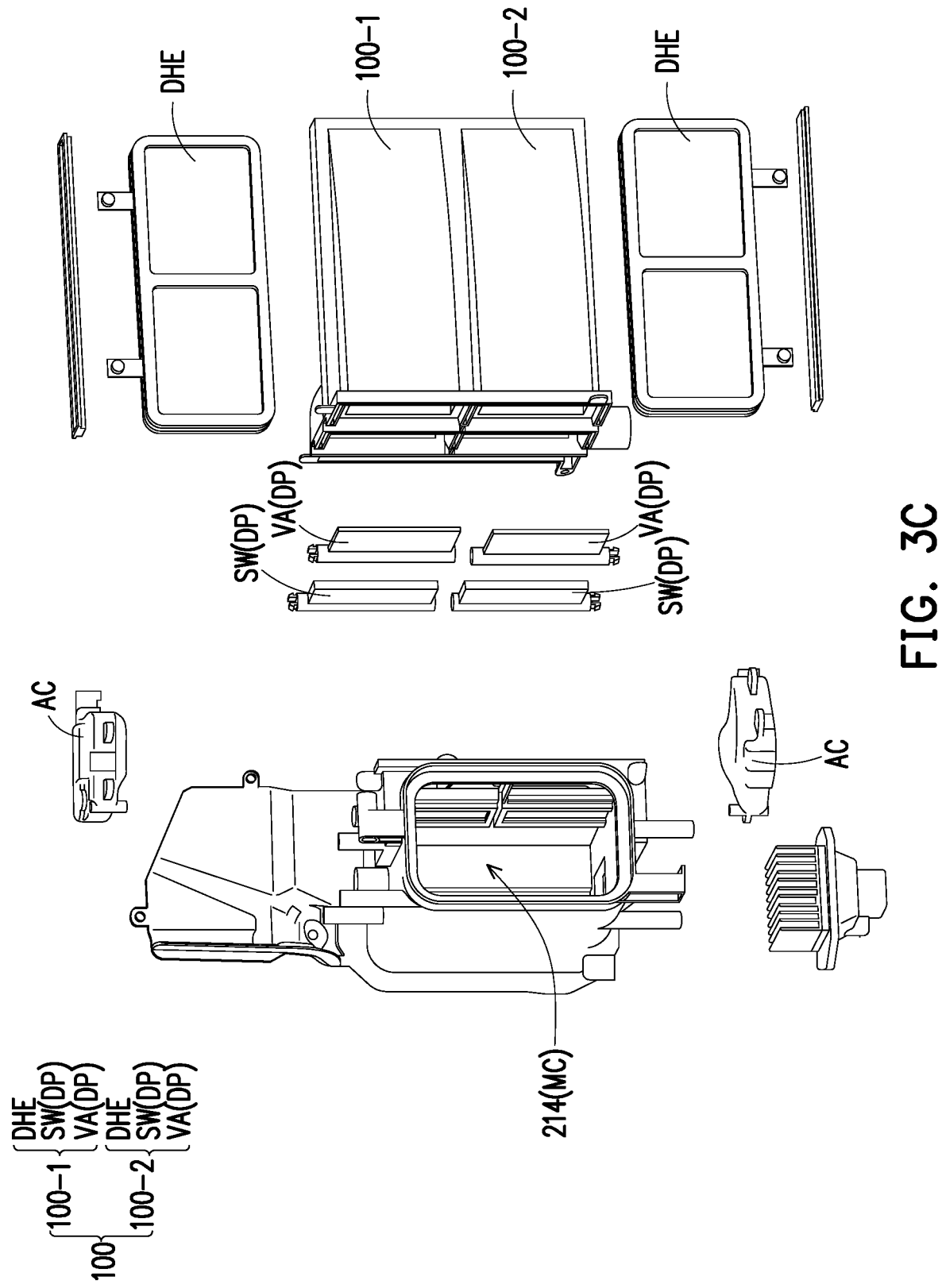
FIG. 3C is an exploded view of the dehumidification device of FIG. 3A.
Figure 5B:
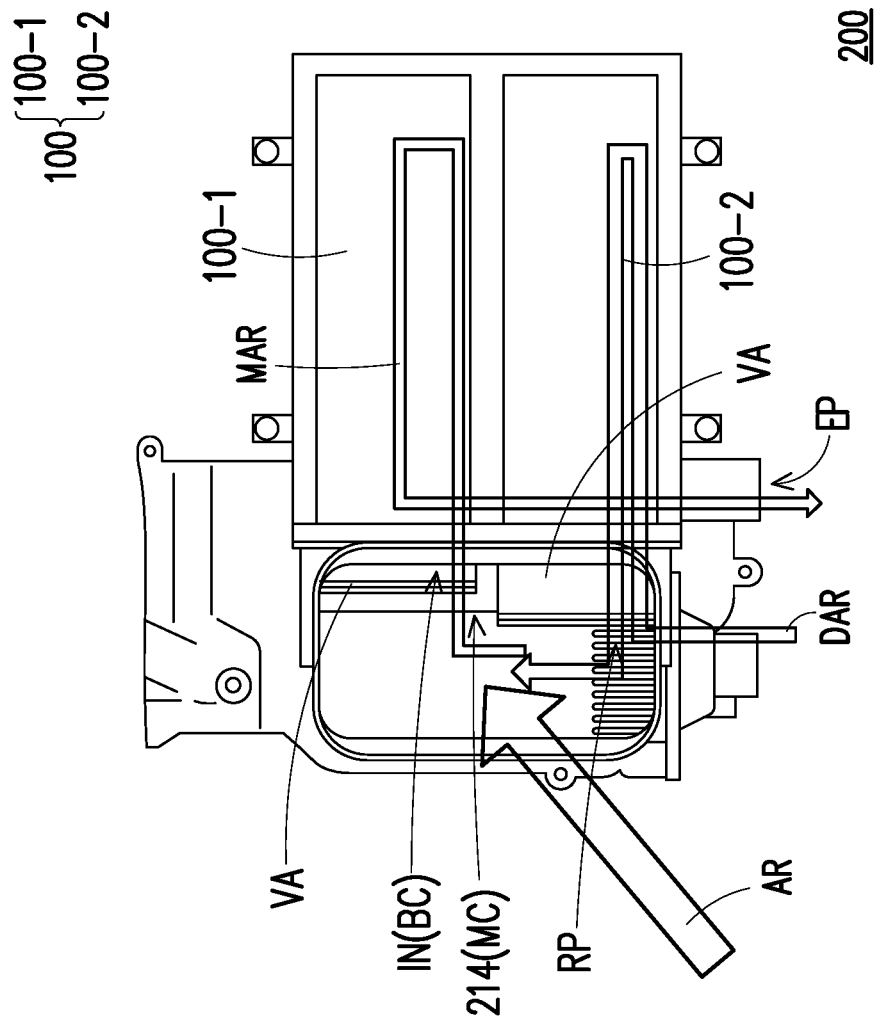
FIG. 5A and FIG. 5B are schematic views comparing channel cross-sectional areas of different air flows of the vehicle air conditioning system of FIG. 2.
Figure 5A:
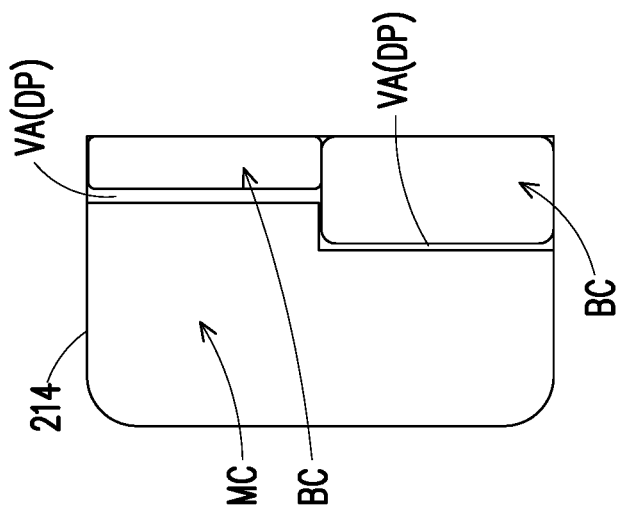
Figure 6:
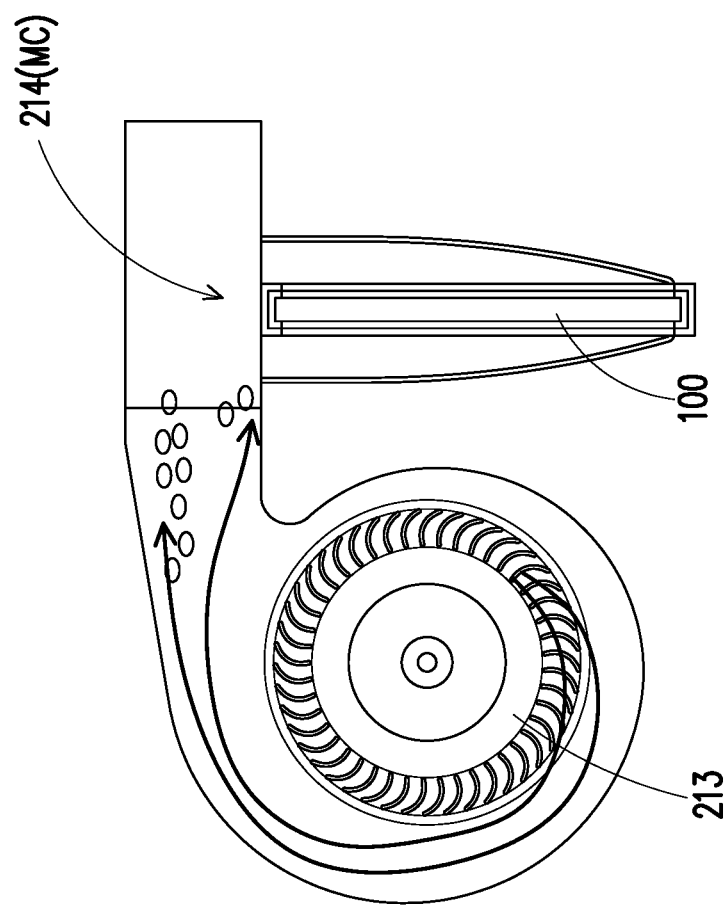
FIG. 6 is a schematic view of relative positions of the dehumidification device and a blower of the vehicle air conditioning system of FIG. 2.
Figure 7B:
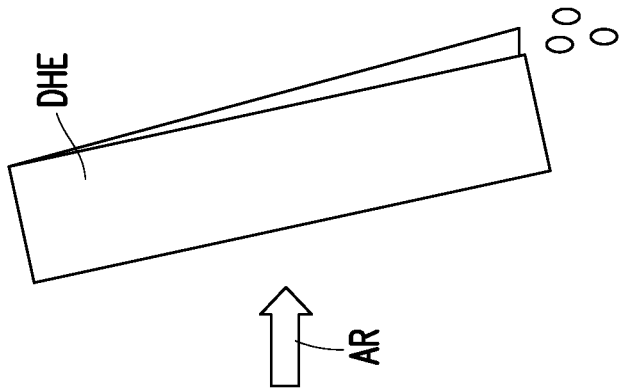
FIG. 7A and FIG. 7B are schematic views of the dehumidification device of FIG. 3A when a moisture-absorbing surface is disposed in different directions.
Figure 7A:
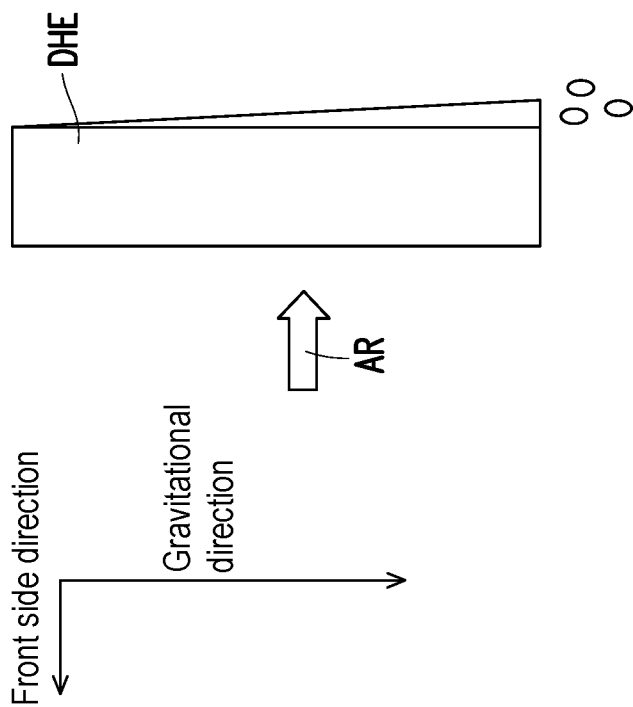

FIG. 1A is a block diagram of a vehicle air conditioning system according to an embodiment of the disclosure; FIG. 1B is a schematic view of an air flow situation during a process of cooling air in the vehicle air conditioning system of FIG. 1A; FIG. 1C is a schematic view of an air flow situation during a process of warming the air in the vehicle air conditioning system of FIG. 1A; FIG. 2 is a schematic structural view of the vehicle air conditioning system of FIG. 1A; FIG. 3A is a schematic structural view of a dehumidification device of the vehicle air conditioning system of FIG. 2; FIG. 3B is a schematic side view of the dehumidification device of FIG. 3A; FIG. 3C is an exploded view of the dehumidification device of FIG. 3A; FIG. 4A to FIG. 4C are schematic cross-sectional views of the dehumidification device of FIG. 3A in different operating modes; FIG. 5A and FIG. 5B are schematic views comparing channel cross-sectional areas of different air flows of the vehicle air conditioning system of FIG. 2; FIG. 6 is a schematic view of relative positions of the dehumidification device and a blower of the vehicle air conditioning system of FIG. 2; FIG. 7A and FIG. 7B are schematic views of the dehumidification device of FIG. 3A when a moisture-absorbing surface is disposed in different directions.

Please refer to FIG. 1A. In the embodiment, a vehicle air conditioning system 200 includes an air conditioning unit 210 and a dehumidification device 100 as a humidity adjustment unit. Specifically, the air conditioning unit 210 (heating, ventilation, and air conditioning, HVAC) can adjust the temperature in a vehicle compartment and includes an air intake end portion 211, an air duct mechanism 212, a blower 213, a connection channel 214, a temperature control module 215, and an air supply end portion 216. Further, as shown in FIG. 1A to FIG. 4C, the air intake end portion 211 of the air conditioning unit 210 includes an outer air intake end portion 211a and an inner air intake end portion 211c. The outer air intake end portion 211a is used to absorb outside air OAR, the inner air intake end portion 211c is used to absorb interior air IAR. The blower 213 is installed in the air duct mechanism 212 and may be controlled to be activated to create a negative pressure environment on the upstream side of the blower 213 and create a positive pressure environment on the downstream side of the blower 213, thereby generating an air flow flowing from the outer air intake end portion 211a or the inner air intake end portion 211c through the air duct mechanism 212, the connection channel 214, and the temperature control module 215 to the air supply end portion 216, wherein the outside air OAR and the interior air IAR merge to form air conditioning air AR after passing through the blower 213. Moreover, in the embodiment, as shown in FIG. 1B and FIG. 1C, the temperature control module 215 has a refrigerating unit 215a and a heating unit 215c, which may cool or warm the air conditioning air AR flowing into the temperature control module 215 through the blower 213 according to requirements, so as to provide a comfortable ambient temperature in the vehicle compartment.

Generally speaking, as shown in FIG. 1B, the refrigerating unit 215a of the temperature control module 215 may be an evaporator of a refrigeration cycle system, has an inlet for refrigerant inflow and an outlet for refrigerant outflow, and is connected to a compressor 215b to circulate the refrigerant for use. During the process of cooling the air conditioning air AR, the refrigerating unit 215a exchanges heat between the air conditioning air AR from the blower 213 and the refrigerant, and the refrigerant absorbs heat to cool the air conditioning air AR. During the cooling process, that is, in a cooling mode of the vehicle air conditioning system 200, since water vapor in the air conditioning air AR is converted into water droplets at the same time, the refrigerating unit 215a of the temperature control module 215 may also have the function of dehumidification, and as shown in FIG. 1B, a comfortable ambient humidity in the vehicle compartment may be implemented without activating the dehumidification device 100.

On the other hand, during the process of warming the air flow, that is, in a warming mode of the vehicle air conditioning system 200, the air conditioning air AR from the blower 213 may be heated and warmed up through turning off the refrigerating unit 215a and the compressor 215b of the refrigeration cycle system and activating the heating unit 215c. For example, in the embodiment, the heating unit 215c may be a heater having a thermistor with a positive temperature coefficient (PTC) and may directly heat the air, a heater core that dissipates heat through heat exchange between a refrigerant heated by exhaust heat of an engine and passing air, a heater core that dissipates heat through heat exchange between a refrigerant heated by an electric heater and passing air, etc. In addition, when the air conditioning unit 210 is a heat pump type, the heating unit 215c may be an indoor condenser, and the refrigerant compressed and heated by the compressor 215b flows into the indoor condenser. In this case, when the air from the blower 213 passes through the heating unit 215c, the air may exchange heat with the high temperature and high pressure refrigerant of the indoor condenser, and the refrigerant dissipates heat, which may also warm the air.

However, in the warming mode of the vehicle air conditioning system 200, when the external air temperature is low and the cooling unit 215c operates, frost forms on the cooling unit 215c, so the cooling unit 215c cannot be used for dehumidification. Therefore, as shown in FIG. 1C, dehumidification needs to be performed through activating the dehumidification device 100, so as to implement a comfortable ambient humidity in the vehicle compartment.

Furthermore, as shown in FIG. 1A and FIG. 3C, in the embodiment, the dehumidification device 100 has a dehumidification element DHE, which can adjust the humidity in the vehicle compartment. For example, as shown in FIG. 3C, in the embodiment, the dehumidification element DHE is a thin dehumidification element and may contain composite material HASClay® synthesized from amorphous aluminum silicate and low crystallinity clay as an adsorbent to absorb moisture in the air, thereby dehumidifying air passing through the dehumidification element DHE. The composite material HASClay® has the advantages of high safety, high adsorption performance within a low humidity range, high speed adsorption of moisture or regeneration cycle, high regeneration efficiency, low power consumption regeneration, low ventilation resistance, high reliability, high heat resistance, light weight, and low cost. In addition, as the adsorbent, besides the composite material HASClay®, a hygroscopic agent such as zeolite, silica gel, and other polymer adsorbents that have high hygroscopicity under a specified humidity environment may also be used. In addition, the thin dehumidification element may, for example, be a honeycomb-shaped base material or a mesh-shaped base material, as long as a component that can be heated through energization is used as a base material that supports the hygroscopic agent. In addition, the thin dehumidification element may also have another type of structure, wherein a predetermined hygroscopic agent is carried on a pleated and air permeable sheet to form a moisture absorption portion, and a heater (a heating portion) of the thin dehumidification element directly contacts the carried moisture absorption portion and heats the moisture absorption portion. In this case, the heater is a plate-shaped heater extending along the direction of the air flow and directly contacts the moisture absorption portion in almost the entire longitudinal direction. Moreover, through using the structural configuration of the thin dehumidification element, the dehumidification device 100 can implement the smallest system volume under the condition of having the same dehumidification capacity. In other words, although the system volume changes according to the dehumidification capacity, since the thin dehumidification elements may be disposed in series, even if the dehumidification device 100 is provided with multiple thin dehumidification elements in order to increase the dehumidification capacity, the size increase caused by the series connection may still be controlled within a small range.

On the other hand, when the amount of moisture adsorbed increases with the lapse of time, the adsorption capacity gradually decreases. Under the above condition, the dehumidification device 100 regenerates the dehumidification element DHE by directly heating the dehumidification element DHE through energization after moisture absorption through a built-in heater (not shown) disposed therein to remove moisture from the adsorbent. In this way, the dehumidification element DHE may be directly heated through the built-in heater to replace air heating, so the regeneration process of the dehumidification element DHE may be efficiently completed in a short time. Also, in the embodiment, the built-in heater has a thermistor with a positive temperature coefficient (PTC) whose resistance value increases as the temperature rises. In this way, the built-in heater has a self-regulating characteristic that suppresses the temperature rise to a predetermined temperature during the regeneration process. Thereby, it is possible to suppress smoke and fire due to abnormal heating, while providing the necessary regeneration temperature to the dehumidification element DHE. In addition, since the dehumidification device 100 is located on the downstream side of the blower 213 and is in a positive pressure environment, heated humidified air MAR can leave the dehumidification device 100 based on ambient pressure, so that the adsorption capacity of the dehumidification element DHE is restored, thereby regenerating the dehumidification element DHE.

Moreover, as shown in FIG. 1A to FIG. 2, in the embodiment, the dehumidification device 100 is disposed between the blower 213 and the temperature control module 215, and a part of the air conditioning air AR flowing in from the blower 213 flows into the dehumidification device 100. Moreover, as shown in FIG. 1A, after the air conditioning air AR flowing into the dehumidification device 100 is dehumidified by the dehumidification device 100, dried air conditioning air DAR dehumidified by the dehumidification device 100 may return to mix with the air conditioning air AR that is not dehumidified. In this way, the vehicle air conditioning system 200 may control the humidity of the air conditioning air AR flowing out of the air supply end portion 216 through mixing the dried air conditioning air DAR dehumidified by the dehumidification device 100 and the air conditioning air AR that is not dehumidified in a main flow channel MC, so that the dehumidification device 100 can be used as the humidity adjustment unit of the vehicle air conditioning system 200. Moreover, through enabling a part of the air conditioning air AR pumped by the blower 213 of the air conditioning unit 210 to the temperature control module 215 to flow to the dehumidification device 100, the dehumidification device 100 does not need to be equipped with a dedicated air supply component, which can simplify the structure and save cost.

The control process and the specific structure when the dehumidification device 100 is used as the humidity adjustment unit of the vehicle air conditioning system 200 will be further explained below with reference to FIG. 3A to FIG. 4C.

Specifically, as shown in FIG. 1A and FIG. 3A to FIG. 4C, in the embodiment, the dehumidification device 100 is disposed on the connection channel 214 connecting the blower 213 of the air conditioning unit 210 and the temperature control module 215. In this way, the impact on the size of the vehicle air conditioning system 200 when the dehumidification device 100 is installed therein can be minimized through using a dead zone between the blower 213 and the temperature control module 215.

Further, as shown in FIG. 1A and FIG. 4A to FIG. 4C, the air conditioning unit 210 also includes the main flow channel MC and a branch flow channel BC. The main flow channel MC is communicated with the air intake end portion 211 and the air supply end portion 216 of the air conditioning unit 210 and is used for the air conditioning air AR flowing in to flow from the blower 213 to the temperature control module 215. The branch flow channel BC diverges from the main flow channel MC, is communicated with the main flow channel MC and the dehumidification device 100, and is used for a part of the air conditioning air AR flowing in from the blower 213 to flow into the dehumidification device 100. Moreover, as shown in FIG. 4A to FIG. 4C, in the embodiment, the connection channel 214 is formed as a part of the main flow channel MC, and the branch flow channel BC is communicated with the connection channel 214.

Moreover, as shown in FIG. 3A to FIG. 4C, in the embodiment, the dehumidification device 100 further includes an air volume adjusting mechanism VA and an air path switching mechanism SW, wherein the air volume adjusting mechanism VA is used to form one of an air inflow channel IN and an air discharge channel EX. The air path switching mechanism SW is used to form the other one of the air inflow channel IN and the air discharge channel EX, wherein the air inflow channel IN is communicated with the branch flow channel BC and may be used for the air conditioning air AR passing through the branch flow channel BC to flow into the dehumidification device 100. The dehumidification element DHE is disposed on a flow path of the part of the air conditioning air AR flowing in from the blower 213 between the air volume adjusting mechanism VA and the air path switching mechanism SW.

Furthermore, as shown in FIG. 3A to FIG. 4C, in the embodiment, the air volume adjusting mechanism VA is used to form the air inflow channel IN, and the air path switching mechanism SW is used to form the air discharge channel EX. For example, in the embodiment, the air volume adjusting mechanism VA and the air path switching mechanism SW both include a damper structure DP that can adjust the degree of opening, and as shown in FIG. 3C, the dehumidification device 100 also includes an actuator AC. The actuator AC is connected to the damper structure DP of the air volume adjusting mechanism VA and the damper structure DP of the air path switching mechanism SW through a mechanism. In this way, as shown in FIG. 3C to FIG. 4C, the actuator AC may be used to control the degree of opening of the damper structure DP to adjust the air volume of the air conditioning air AR flowing into the dehumidification device 100 and also control the degree of opening of the damper structure DP of the air path switching mechanism SW to switch the air discharge channel EX between a return air path RP and a discharge air path EP, wherein the return air path RP is an air path for returning the dehumidified dried air conditioning air DAR back to the main flow path MC of the air conditioning unit 210, and the discharge air path EP is an air path for discharging the humidified air MAR generated after heating the dehumidification device 100 to the outside of the vehicle.

In this way, the dehumidification device 100 may switch between dehumidification and regeneration processes through the air path selection of the air path switching mechanism SW, and the dried air conditioning air DAR dehumidified by the dehumidification device 100 can be adjusted to be supplied at a predetermined air volume and the humidified air MAR generated after heating the dehumidification device 100 may be discharged at a predetermined air volume through controlling the degree of opening of the damper structure DP of the air volume adjusting mechanism VA.

Further, in the embodiment, there are multiple dehumidification devices 100, including a first dehumidification device 100-1 and a second dehumidification device 100-2, wherein when dehumidification is performed through the dehumidification element DHE of one of the first dehumidification device 100-1 and the second dehumidification device 100-2, the other one of the first dehumidification device 100-1 and the second dehumidification device 100-2 heats the dehumidification element DHE of the other one to regenerate the other one of the first dehumidification device 100-1 and the second dehumidification device 100-2. In this way, the dehumidification device 100 can alternately dehumidify the air conditioning air AR flowing into the dehumidification device 100 through both the first dehumidification device 100-1 and the second dehumidification device 100-2 without interruption, and can also intermittently regenerate the first dehumidification device 100-1 and the second dehumidification device 100-2 respectively, thereby maintaining preferable dehumidification performance all the time.

Further, as shown in FIG. 4A, in the embodiment, when the vehicle air conditioning system 200 cools the air, that is, in the cooling mode of the vehicle air conditioning system 200, the dehumidification device 100 does not operate. At this time, in the dehumidification device 100, the air volume adjusting mechanism VA of the first dehumidification device 100-1, the air volume adjusting mechanism VA of the second dehumidification device 100-2, the built-in heater of the first dehumidification device 100-1, and the built-in heater of the second dehumidification device 100-2 are all turned off, and the air discharge channels EX of the air path switching mechanism SW of the first dehumidification device 100-1 and the air path switching mechanism SW of the second dehumidification device 100-2 are both switched to the discharge air paths EP with the return air paths RP closed.

On the other hand, when the vehicle air conditioning system 200 warms the air, that is, in the warming mode of the vehicle air conditioning system 200, the dehumidification device 100 operates and sequentially switches in turn the sizes of the degrees of opening of the damper structures DP of the air volume adjusting mechanism VA of the first dehumidification device 100-1 and the air volume adjusting mechanism VA of the second dehumidification device 100-2, opening states of the built-in heater of the first dehumidification device 100-1 and the built-in heater of the second dehumidification device 100-2, and switching states of the air path switching mechanism SW of the first dehumidification device of 100-1 and the air path switching mechanism SW of the second dehumidification device 100-2 between different paths.

For example, as shown in FIG. 4B and FIG. 4C, in the embodiment, when dehumidification is performed through the first dehumidification device 100-1, as shown in FIG. 4B, the damper structure DP of the air volume adjusting mechanism VA of the first dehumidification device 100-1 is opened, so that the air conditioning air AR passing through the branch flow channel BC flows into the dehumidification device 100 for dehumidification, and the air path switching mechanism SW of the first dehumidification device 100-1 switches the air discharge channel EX of the first dehumidification device 100-1 to the return air path RP of the first dehumidification device 100-1, so that the dried air conditioning air DAR dehumidified by the first dehumidification device 100-1 can return to the main flow channel MC of the air conditioning unit 210. Also, at the same time, the built-in heater of the second dehumidification device 100-2 is also turned on to heat the dehumidification element DHE of the second dehumidification device 100-2, so as to regenerate the second dehumidification device 100-2. At this time, as shown in FIG. 4C, the air path switching mechanism SW of the second dehumidification device 100-2 switches the air discharge channel EX of the second dehumidification device 100-2 to the discharge air path EP of the second dehumidification device 100-2, and the damper structure DP of the air volume adjusting mechanism VA of the second dehumidification device 100-2 is also opened, so that the humidified air MAR generated after heating the second dehumidification device 100-2 can leave the second dehumidification device 100-2 based on the ambient pressure and be discharged to the outside of the vehicle.

Similarly, in the embodiment, when dehumidification is performed through the second dehumidification device 100-2, the damper structure DP of the air volume adjusting mechanism VA of the second dehumidification device 100-2 is also opened as shown in FIG. 4B, so that the air conditioning air AR passing through the branch flow channel BC flows into the dehumidification device 100 for dehumidification, and the air path switching mechanism SW of the second dehumidification device 100-2 switches the air discharge channel EX of the second dehumidification device 100-2 to the return air path RP of the second dehumidification device 100-2, so that the dried air conditioning air DAR dehumidified by the second dehumidification device 100-2 can return to the main flow channel MC of the air conditioning unit 210. Also, at the same time, the built-in heater of the first dehumidification device 100-1 is also turned on to heat the dehumidification element DHE of the first dehumidification device 100-1, so as to regenerate the first dehumidification device 100-1. At this time, the air path switching mechanism SW of the first dehumidification device 100-1 switches the air discharge channel EX of the first dehumidification device 100-1 to the discharge air path EP of the first dehumidification device 100-1 as shown in FIG. 4C, and the damper structure DP of the air volume adjusting mechanism VA of the first dehumidification device 100-1 is also opened, so that the humidified air MAR generated after heating the second dehumidification device 100-2 can leave the second dehumidification device 100-2 based on the ambient pressure and be discharged to the outside of the vehicle.

On the other hand, in the embodiment, the degree of opening of the damper structure DP of the air volume adjusting mechanism VA can be used to form and adjust the size of an adjustable cross-sectional area of an inflow pathway of the branch flow channel BC, so that the sizes of the degrees of opening of the damper structure DP of the air volume adjusting mechanism VA of the first dehumidification device 100-1 and the damper structure DP of the air volume adjusting mechanism VA of the second dehumidification device 100-2 determine the air volume of the air conditioning air AR passing through the first dehumidification device 100-1 and the second dehumidification device 100-2 and an air supply volume. Moreover, the required air volumes of the first dehumidification device 100-1 and the second dehumidification device 100-2 during the dehumidification process and the regeneration process vary due to operating conditions. During the dehumidification process, in order to meet the requirements of humidity control, there is a certain requirement for the air supply volume of the air conditioning air AR during the dehumidification process. When the air supply volume of the dehumidified dried air conditioning air DAR fluctuates with time, the dehumidification performance also fluctuates with time, thereby affecting the anti-fog performance in the vehicle. On the other hand, during the regeneration process, if the air volume of the humidified air MAR on the regeneration side increases, the ambient temperature will decrease, and the dehumidification performance may also decrease. However, once the air supply volume of the humidified air MAR on the regeneration side decreases, the dew point temperature of the humidified air MAR may increase. In the case where the dew point temperature of the humidified air MAR exceeds a threshold value of the dew point temperature of air at a discharge port, condensation may easily occur during discharge from the vehicle, thereby risking deteriorating the vehicle body. Therefore, in the embodiment, the degree of opening of the damper structure DP of the air volume adjusting mechanism VA is maintained, so that the air supply volume of the dehumidified dried air conditioning air DAR and the air supply volume of the humidified air MAR generated after heating are both controlled in a certain manner. For example, in the embodiment, the air supply volume of the dehumidified dried air conditioning air DAR is 45 m$^3$/h, and the air supply volume of the humidified air MAR generated after heating is 5 m$^3$/h.

In other words, in the embodiment, the air supply volume of the dehumidified dried air conditioning air DAR during the dehumidification process is greater than the air supply volume of the humidified air MAR generated after heating during the regeneration process. Therefore, as shown in FIG. 4B and FIG. 4C, in the embodiment, when dehumidification is performed through the second dehumidification device 100-2, the degree of opening of the damper structure DP of the air volume adjusting mechanism VA of the second dehumidification device 100-2 is greater than the degree of opening of the damper structure DP of the air volume adjusting mechanism VA of the first dehumidification device 100-1, and when dehumidification is performed through the first dehumidification device 100-1, the degree of opening of the damper structure DP of the air volume adjusting mechanism VA of the first dehumidification device 100-1 is greater than the degree of opening of the damper structure DP of the air volume adjusting mechanism VA of the second dehumidification device 100-2.

In this way, through sequentially and synchronously switching in turn the sizes of the degrees of opening of the damper structures DP of the air volume adjusting mechanism VA of the first dehumidification device 100-1 and the air volume adjusting mechanism VA of the second dehumidification device 100-2, the opening states of the built-in heater of the first dehumidification device 100-1 and the built-in heater of the second dehumidification device 100-2, and the switching states of the air path switching mechanism SW of the first dehumidification device of 100-1 and the air path switching mechanism SW of the second dehumidification device 100-2 between different paths, the dehumidification device 100 can alternately dehumidify the air conditioning air AR flowing into the dehumidification device 100 through the first dehumidification device 100-1 and the second dehumidification device 100-2, and regenerate the first dehumidification device 100-1 or the second dehumidification device 100-2 at the same time.

In addition, the damper structure DP of the air volume adjusting mechanism VA of the first dehumidification device 100-1 and the damper structure DP of the air volume adjusting mechanism VA of the second dehumidification device 100-2 may be respectively used to adjust the air volume of the air conditioning air AR flowing into the first dehumidification device 100-1 and the air volume of the air conditioning air AR flowing into the second dehumidification device 100-2. Therefore, through adjusting the degrees of opening of the damper structure DP of the air volume adjusting mechanism VA of the first dehumidification device 100-1 and the damper structure DP of the air volume adjusting mechanism VA of the second dehumidification device 100-2, the dried air conditioning air DAR dehumidified by the dehumidification device 100 can be adjusted to be supplied at a predetermined air volume and the humidified air MAR generated after heating the dehumidification device 100 can be discharged at a predetermined air volume respectively when the dehumidification device 100 performs the dehumidification and regeneration processes on the air conditioning air AR flowing into the dehumidification device 100 through any one of the first dehumidification device 100-1 and the second dehumidification device 100-2.

In this way, the dehumidification device 100 can alternately dehumidify the air conditioning air AR flowing into the dehumidification device 100 through both the first dehumidification device 100-1 and the second dehumidification device 100-2 without interruption, and can also intermittently regenerate the first dehumidification device 100-1 and the second dehumidification device 100-2 respectively, thereby maintaining preferable dehumidification performance all the time.

Specifically, in the embodiment, the dehumidification device 100 can control the first dehumidification device 100-1 and the second dehumidification device 100-2 to alternately switch to execute the dehumidification or regeneration process at a predetermined time interval. In this way, since no additional elements are required, the dehumidification device 100 can switch between the dehumidification and regeneration processes with a simple structure and low cost. Also, through shortening the cycle of alternately switching the first dehumidification device 100-1 and the second dehumidification device 100-2 to dehumidify and regenerate the air conditioning air AR flowing into the dehumidification device 100, the required hygroscopic material may be reduced, thereby reducing product cost and saving space. For example, in the embodiment, the time taken for the dehumidification device 100 to alternately dehumidify the air conditioning air AR flowing into the dehumidification device 100 respectively through the first dehumidification device 100-1 and the second dehumidification device 100-2 and the time taken to regenerate the first dehumidification device 100-1 and the second dehumidification device 100-2 are approximately 3 minutes each, but the disclosure is not limited thereto. In other embodiments, the dehumidification device 100 can alternately switch the dehumidification cycle time and the regeneration cycle time of the first dehumidification device 100-1 and the second dehumidification device 100-2 according to actual requirements. For example, in another embodiment, the dehumidification device 100 may alternately switch the dehumidification or regeneration cycle time of the first dehumidification device 100-1 and the second dehumidification device 100-2 in batches based on information of a temperature and humidity sensor disposed on the air inflow channel IN or the air discharge channel EX of at least any one of the first dehumidification device 100-1 and the second dehumidification device 100-2. In this way, based on the information of the temperature and humidity sensor disposed on the air inflow channel IN or the air discharge channel EX of at least any one of the first dehumidification device 100-1 and the second dehumidification device 100-2, the dehumidification device 100 can more efficiently execute the dehumidification and regeneration processes.

On the other hand, in the embodiment, the size relationship of the air volume of the air conditioning air AR flowing into the dehumidification device 100 via the branch flow channel BC relative to the air volume of the air conditioning air AR of the main flow channel MC may also be controlled through adjusting the sizes of the degrees of opening of the damper structure DP of the air volume adjusting mechanism VA of the first dehumidification device 100-1 and the damper structure DP of the air volume adjusting mechanism VA of the second dehumidification device 100-2. For example, as shown in FIG. 5A and FIG. 5B, in the embodiment, the adjustable cross-sectional area of the inflow pathway of the branch flow channel BC is less than or equal to half of the cross-sectional area of the connection channel 214 (that is, the main flow channel MC). Thus, in the embodiment, the air volume of the part of the air conditioning air AR flowing into the dehumidification device 100 from the branch flow channel BC is less than or equal to the air volume of another part of the air conditioning air AR not flowing into the dehumidification device 100 in the main flow channel MC. In this way, through controlling the air volume of the air conditioning air AR flowing into the dehumidification device 100 via the branch flow channel BC to be less than the air volume of the air conditioning air AR of the main flow channel MC, increases in ventilation resistance in the air conditioning unit 210 can be suppressed and increases in power consumption of the blower 213 can be suppressed.

On the other hand, as shown in FIG. 6, in the embodiment, the dehumidification device 100 installed in the connection channel 214 is installed on a side of a housing peripheral wall opposite to an air supply port of the blower 213 for connecting the main flow channel MC in a centrifugal direction. In this way, when air with water droplets from the air intake end portion 211 of the vehicle air conditioning system 200 is absorbed and discharged by the blower 213, the water droplets are pushed out in the centrifugal direction, so as to prevent the water droplets from entering the dehumidification device 100 installed on the opposite side.

In addition, as shown in FIG. 7A, in the embodiment, the moisture-absorbing surface of the dehumidification element DHE may be disposed parallel to a gravitational direction and perpendicular to a front side direction of the vehicle. In this way, even when the air containing water droplets is blown into the dehumidification device 100, the water droplets may still slide down along the gravitational direction due to their own weight, thereby suppressing a water film from staying in the dehumidification device 100. However, the disclosure is not limited thereto. In another embodiment, the moisture-absorbing surface of the dehumidification element DHE may also be disposed to be inclined to the front side direction of the vehicle relative to the gravitational direction, and the moisture-absorbing surface faces diagonally below a vehicle front side. In this way, the air containing water droplets may also slide down along the gravitational direction due to their own weight when blown into the dehumidification device 100 without staying in the dehumidification device 100.

In this way, the dehumidification device 100 may be integrated in the vehicle air conditioning system 200 as the humidity adjustment unit through sharing the structures of the blower 213 and the housing with the vehicle air conditioning system 200, and through sharing the configuration of the air flow channel of the vehicle air conditioning system 200, increases in the ventilation resistance and increases in the power consumption of the blower 213 can be suppressed. At the same time, through simplifying the necessary components of the vehicle air conditioning system 200, even lower power consumption can be ensured while suppressing increases in cost.

Moreover, through simply controlling the size of the degree of opening of the damper structure DP of the air volume adjusting mechanism VA of the dehumidification device 100, the size relationship of the air volume of the air conditioning air AR flowing into the dehumidification device 100 via the branch flow channel BC relative to the air volume of the air conditioning air AR of the main flow channel MC can be controlled, and the air supply volume during the dehumidification and regeneration processes of the air conditioning air AR flowing into the dehumidification device 100 can be adjusted. In addition, through disposing the dehumidification device 100 on the side of the housing peripheral wall opposite to the air supply port of the blower 213 for connecting the main flow channel MC in the centrifugal direction and configuring the moisture-absorbing surface of the dehumidification element DHE of the dehumidification device 100 to be parallel to the gravitational direction or facing diagonally below the vehicle front side and inclined relative to the gravitational direction, the impact caused by external water splashing or water droplets staying on the dehumidification element DHE can be prevented, thereby reducing the risk of deterioration of elements of the dehumidification device 100, so as to have preferable reliability.

In addition, through disposing the dehumidification device 100 as the humidity adjustment unit on the connection channel 214 connecting the blower 213 of the air conditioning unit 210 and the temperature control module 215, the impact on the size of the vehicle air conditioning system 200 when the dehumidification device 100 is installed therein can be minimized through using the dead zone between the blower 213 and the temperature control module 215. In addition, the dehumidification device 100 can alternately dehumidify the air conditioning air AR flowing into the dehumidification device 100 through both the first dehumidification device 100-1 and the second dehumidification device 100-2 without interruption, and can also intermittently regenerate the first dehumidification device 100-1 and the second dehumidification device 100-2 respectively, thereby maintaining preferable dehumidification performance all the time.

Figure 8A:
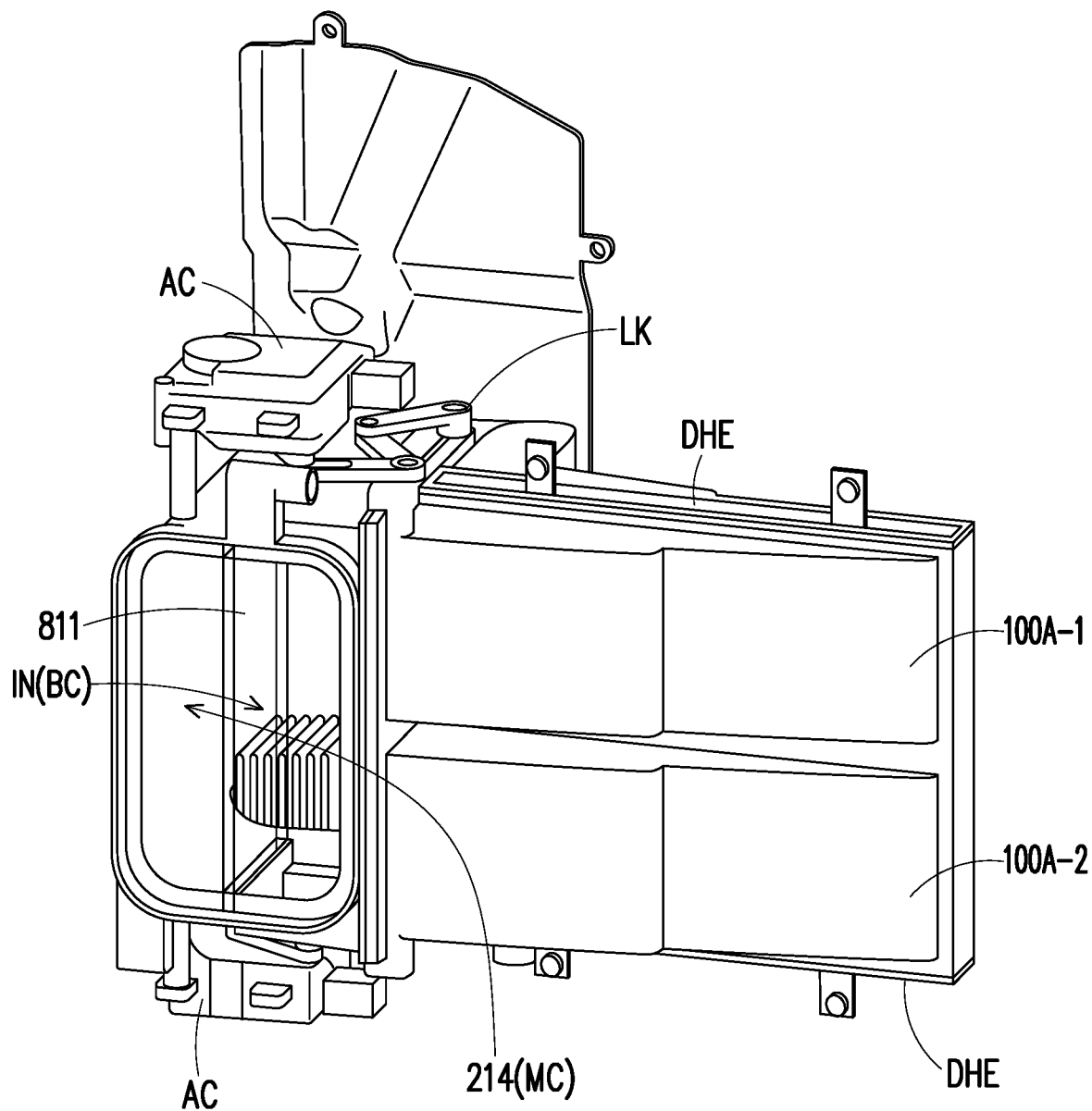
FIG. 8A is a schematic structural view of another vehicle air conditioning system of FIG. 1A.
Figure 8C:
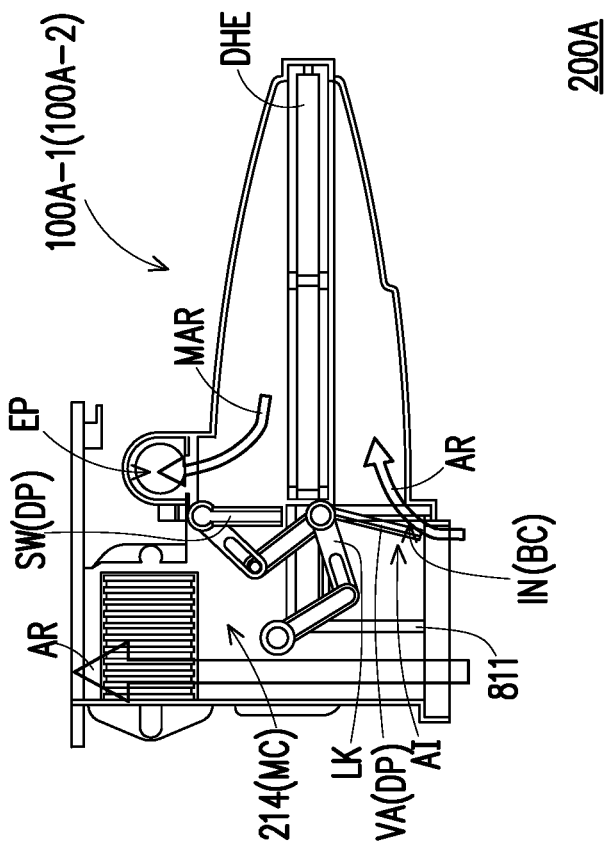
FIG. 8B and FIG. 8C are schematic cross-sectional views of the dehumidification device of FIG. 3A in a warming mode.
Figure 8B:
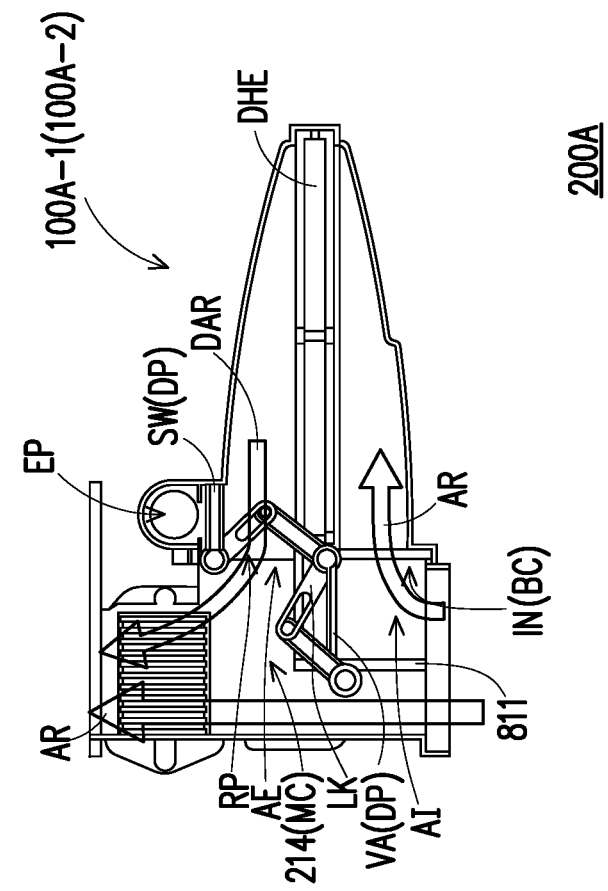

FIG. 8A is a schematic structural view of another vehicle air conditioning system of FIG. 1A; and FIG. 8B and FIG. 8C are schematic cross-sectional views of the dehumidification device of FIG. 3A in a warming mode. Please refer to FIG. 8A to FIG. 8C. A vehicle air conditioning system 200A and a dehumidification device 100A of the embodiment are respectively similar to the vehicle air conditioning system 200 and the dehumidification device 100, and the differences between the two are as follows. In the embodiment, the vehicle air conditioning system 200A further includes a partition 811. Specifically, in the embodiment, the partition 811 is disposed in the main flow channel MC and is used to divert a part of the air conditioning air AR in the main flow channel MC to the branch flow channel BC. Further, as shown in FIG. 8A to FIG. 8C, in the embodiment, the partition 811 faces an air inlet AI of the dehumidification device 100A, and the partition 811 extends from an end of the air inlet AI of the dehumidification device 100A to the other end of the air inlet AI of the dehumidification device 100A. In this way, through the configuration of the partition 811, a substantial boundary of the branch flow channel BC may be drawn in the main flow channel MC, and the part of the air conditioning air AR diverted to the branch flow channel BC can more efficiently flow into the air inlet AI of the dehumidification device 100A.

In addition, as shown in FIG. 8A to FIG. 8C, in the embodiment, the degrees of opening of the damper structures DP of the air volume adjusting mechanism VA and the air path switching mechanism SW are linked through a connection mechanism LK. In this way, when the vehicle air conditioning system 200A warms the air, that is, in the warming mode of the vehicle air conditioning system 200A, the dehumidification device 100A operates, and when the states of the first dehumidification device 100A-1 and the second dehumidification device 100A-2 are sequentially switched in turn, the sizes of the degrees of opening of the damper structures DP of the air volume adjusting mechanism VA of the first dehumidification device 100A-1 and the air volume adjusting mechanism VA of the second dehumidification device 100A-2, and the switching states of the air path switching mechanism SW of the first dehumidification device 100A-1 and the air path switching mechanism SW of the second dehumidification device 100A-2 between different paths may be linked to be switched through the connection mechanism LK.

For example, as shown in FIG. 8B and FIG. 8C, in the embodiment, when dehumidification is performed through the first dehumidification device 100A-1, as shown in FIG. 8B, the damper structure DP of the air volume adjusting mechanism VA of the first dehumidification device 100A-1 is opened to a predetermined degree of opening, and the air path switching mechanism SW of the first dehumidification device 100A-1 links and switches the air discharge channel EX of the first dehumidification device 100A-1 to the return air path RP of the first dehumidification device 100A-1 through the connection mechanism LK. Also, at the same time, as shown in FIG. 8C, the air path switching mechanism SW of the second dehumidification device 100A-2 switches the air discharge channel EX of the second dehumidification device 100A-2 to the discharge air path EP of the second dehumidification device 100A-2, and the damper structure DP of the air volume adjusting mechanism VA of the second dehumidification device 100A-2 is also opened to a predetermined degree of opening through the connection mechanism LK, so that the humidified air MAR generated after heating the second dehumidification device 100A-2 can leave the second dehumidification device 100A-2 and be discharged to the outside of the vehicle based on the ambient pressure.

Similarly, in the embodiment, when dehumidification is performed through the second dehumidification device 100A-2, the damper structure DP of the air volume adjusting mechanism VA of the second dehumidification device 100A-2 is also opened to a predetermined degree of opening, and the air path switching mechanism SW of the second dehumidification device 100A-2 also links and switches the air discharge channel EX of the second dehumidification device 100A-2 to the return air path RP of the second dehumidification device 100A-2 through the connection mechanism LK. Also, at the same time, the air path switching mechanism SW of the first dehumidification device 100A-1 switches the air discharge channel EX of the first dehumidification device 100A-1 to the discharge air path EP of the first dehumidification device 100A-1 as shown in FIG. 8C, and the damper structure DP of the air volume adjusting mechanism VA of the first dehumidification device 100A-1 is also linked and opened to a predetermined degree of opening through the connection mechanism LK, so that the humidified air MAR generated after heating the second dehumidification device 100A-2 can leave the second dehumidification device 100A-2 and be discharged to the outside of the vehicle based on the ambient pressure.

In this way, the dehumidification device 100A can alternately dehumidify the air conditioning air AR flowing into the dehumidification device 100A through both the first dehumidification device 100A-1 and the second dehumidification device 100A-2 without interruption, and can also intermittently regenerate the first dehumidification device 100A-1 and the second dehumidification device 100A-2, thereby maintaining preferable dehumidification performance all the time. Moreover, since the structure of the dehumidification device 100A is similar to the structure of the dehumidification device 100, the dehumidification device 100A can also achieve similar effects and advantages as those of the dehumidification device 100, so details are not repeated here. Moreover, the vehicle air conditioning system 200A adopting the dehumidification device 100A can also achieve similar effects and advantages as those of the vehicle air conditioning system 200, so details are also not repeated here.

In addition, it is worth noting that in the foregoing embodiments, although the size relationship of the air volume of the air conditioning air AR flowing into the dehumidification device 100 or 100A via the branch flow channel BC relative to the air volume of the air conditioning air AR of the main flow channel MC may be controlled through simply adjusting the sizes of the degrees of opening of the damper structure DP of the air volume adjusting mechanism VA of the first dehumidification device 100-1 or 100A-1 and the damper structure DP of the air volume adjusting mechanism VA of the second dehumidification device 100-2 or 100A-2, the disclosure is not limited thereto. In other embodiments, other mechanisms may also be disposed to more finely control the air volumes of the air conditioning air AR in the branch flow channel BC and the main flow channel MC. Further description will be made below with reference to FIG. 9A to FIG. 9E.

FIG. 9A to FIG. 9E are schematic cross-sectional views of different vehicle air conditioning systems of FIG. 1A. Please refer to FIG. 9A to FIG. 9E. Vehicle air conditioning systems 200B, 200C, 200D, 200E, and 200F of the embodiments are similar to the vehicle air conditioning system 200, and the differences between the two are as follows.

Figure 9B:
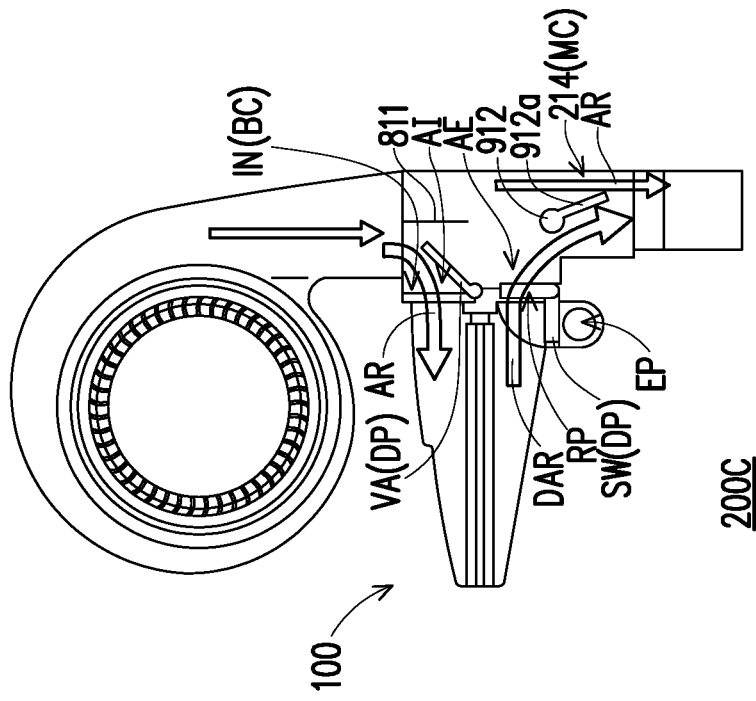
Figure 9A:
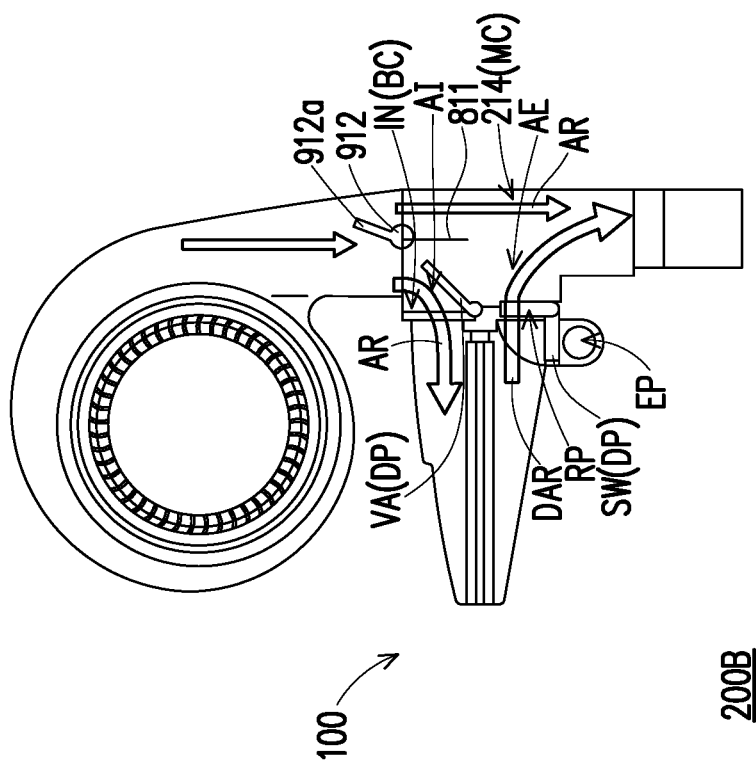

In the embodiments of FIG. 9A, FIG. 9B, and FIG. 9D, the vehicle air conditioning systems 200B, 200C, and 200E further include a main flow air volume distribution mechanism 912. In the embodiments, the main flow air volume distribution mechanism 912 is disposed in the main flow channel MC, wherein the main flow air volume distribution mechanism 912 includes a damper structure 912a that may freely adjust a damper direction to be used to control the air volume of the air conditioning air AR in the main flow channel MC.

For example, in the embodiment of FIG. 9A, the main flow air volume distribution mechanism 912 of the vehicle air conditioning system 200B is located on a connection portion 214a of the air supply port of the blower 213 for connecting the main flow channel MC and the connection channel 214 and extends toward the upstream side of the air supply port of the blower 213. Also, as shown in FIG. 9A, through controlling the damper direction of the damper structure 912a of the main flow air volume distribution mechanism 912, the projection area of the damper structure 912a of the main flow air volume distribution mechanism 912 on the cross-section of the connection channel 214 may be adjusted at the same time. In this way, the channel area of a flow inlet of the main flow channel MC in the connection channel 214 may be adjusted, thereby controlling the air volume of the air conditioning air AR flowing from the blower 213 into the main flow channel MC in the connection channel 214.

On the other hand, in the embodiment of FIG. 9B and FIG. 9D, the main flow air volume distribution mechanism 912 of the vehicle air conditioning system 200C or 200E is located on the flow path of the dehumidified dried air conditioning air DAR flowing from an exhaust port AE of the dehumidification device 100 to the temperature control module 215, and the dehumidified dried air conditioning air DAR merges with another part of the air conditioning air AR that has not flowed into the dehumidification device 100 in the main flow path MC after passing through the main flow air volume distribution mechanism 912. Moreover, as shown in FIG. 9B and FIG. 9D, through controlling the damper direction of the damper structure 912a of the main flow air volume distribution mechanism 912, the projection area of the damper structure 912a of the main flow air volume distribution mechanism 912 on the cross-section of the connection channel 214 may also be adjusted at the same time. In this way, the channel area of the discharge port of the main flow channel MC in the connection channel 214 may be adjusted, thereby also controlling the air volume of the air conditioning air AR of the main flow channel MC in the connection channel 214.

In this way, in the embodiment of FIG. 9A, FIG. 9B and FIG. 9D, in the case where the air supply volume passing through the blower 213 of the vehicle air conditioning system 200B, 200C, or 200E changes according to the temperature inside the vehicle, the air volume of the air conditioning air AR of the main flow channel MC in the connection channel 214 may be adjusted through adjusting the projection area of the damper structure 912a of the main flow air volume distribution mechanism 912 on the cross-section of the connection channel 214. In this way, even in the case where the air supply volume passing through the blower 213 of the vehicle air conditioning system 200B, 200C, or 200E gradually decreases according to the temperature inside the vehicle to control the air supply volume of the high temperature air of the vehicle air conditioning system 200, the channel area of the main flow channel MC in the connection channel 214 may also be reduced through the main flow air volume distribution mechanism 912, so that the air conditioning air AR flowing into the dehumidification device 100 via the branch flow channel BC can still maintain a certain air volume.

On the other hand, in the embodiments of FIG. 9C and FIG. 9E, the vehicle air conditioning systems 200D and 200F may also further extend the partition 811 of FIG. 8B, so that the air conditioning air AR flowing into the dehumidification device 100 via the branch flow channel BC can still maintain a certain air volume. For example, as shown in FIG. 9C and FIG. 9E, a partition 911 of the vehicle air conditioning system 200D or 200F faces the air inlet AI and the exhaust port AE of the dehumidification device 100, and the partition 911 extends from the upstream side of the air supply port of the blower 213 for connecting the main flow channel MC to an end of the exhaust port AE of the dehumidification device 100 away from the air inlet AI. In this way, through extending the partition 911, a certain proportion of the air volume of the air conditioning air AR from the blower 213 is introduced into the branch flow channel BC. Therefore, even in the case where the air supply volume passing through the blower 213 of the vehicle air conditioning system 200D or 200F gradually decreases according to the temperature inside the vehicle, the air conditioning air AR from the blower 213 can always be introduced into the dehumidification device 100 at a fixed proportion.

In addition, in the embodiment of FIG. 9C, the vehicle air conditioning system 200D may further include a windproof plate 913. The windproof plate 913 is disposed in the main flow channel MC and is connected to the partition 911 to separate the air inflow channel IN and the air discharge channel EX. In this way, as shown in FIG. 9C, the vehicle air conditioning system 200D can more reliably introduce the part of the air conditioning air AR diverted to the branch flow channel BC into the dehumidification device 100.

In this way, the vehicle air conditioning system 200A, 200B, 200C, 200D, 200E, or 200F may more finely control the air volume of the air conditioning air AR in the branch flow channel BC and the main flow channel MC through the configuration of mechanisms such as the main flow air volume distribution mechanism 912, the windproof plate 913, and/or the partition 811 or 911, so that the air volume of the air conditioning air AR flowing into the dehumidification device 100 via the branch flow channel BC can always maintain a certain air volume. Moreover, in the foregoing embodiments, since the vehicle air conditioning system 200A, 200B, 200C, 200D, 200E, or 200F also adopt the dehumidification device 100, similar effects and advantages as those of the vehicle air conditioning system 200 can also be achieved, so details are also not repeated here.

Please refer to FIG. 10A to FIG. 12C. A vehicle air conditioning system 400 and a dehumidification device 300 of the embodiment are respectively similar to the vehicle air conditioning system 200 and the dehumidification device 100, and the differences between the two are as follows. Specifically, as shown in FIG. 10A to FIG. 12C, in the embodiment, the dehumidification device 300 is disposed in front of the evaporator EV of the temperature control module 215 of the vehicle air conditioning system 400 as the refrigerating unit 215a of the cooling mode of the vehicle air conditioning system 400 and is configured in the temperature control module 215. Moreover, as shown in FIG. 10B, in the cooling mode of the vehicle air conditioning system 400, since water vapor in the air conditioning air AR is converted into water droplets at the same time, the temperature control module 215 may also have the function of dehumidification, and a comfortable ambient humidity in the vehicle compartment can be implemented without activating the dehumidification device 300. On the other hand, in the warming mode of the vehicle air conditioning system 400, since the air conditioning unit 210 of the vehicle air conditioning system 400 cannot perform dehumidification through the temperature control module 215 at this time, as shown in FIG. 1C, dehumidification needs to be performed through activating the dehumidification device 300, so as to implement a comfortable ambient humidity in the vehicle compartment.

Furthermore, as shown in FIG. 11A to FIG. 12C, in the embodiment, the dehumidification device 300 is disposed below the main flow channel MC, and the evaporator EV is disposed diagonally above the dehumidification device 300. The air inflow channel IN of the branch flow channel BC and the dehumidification device 300 is formed through controlling the opening and closing of the damper structure DP of the air volume adjusting mechanism VA and may be used for the air conditioning air AR passing through the branch flow channel BC to flow into the dehumidification device 300. On the other hand, in the embodiment, the air path switching mechanism SW is the damper structure DP with an air guide surface and can also switch the air discharge channel EX between the return air path RP and the discharge air path EP. In addition, the dehumidification device 300 can also be switched between the dehumidification and regeneration processes through the air path selection of the air discharge channel EX formed by the air path switching mechanism SW.

Figure 12A:
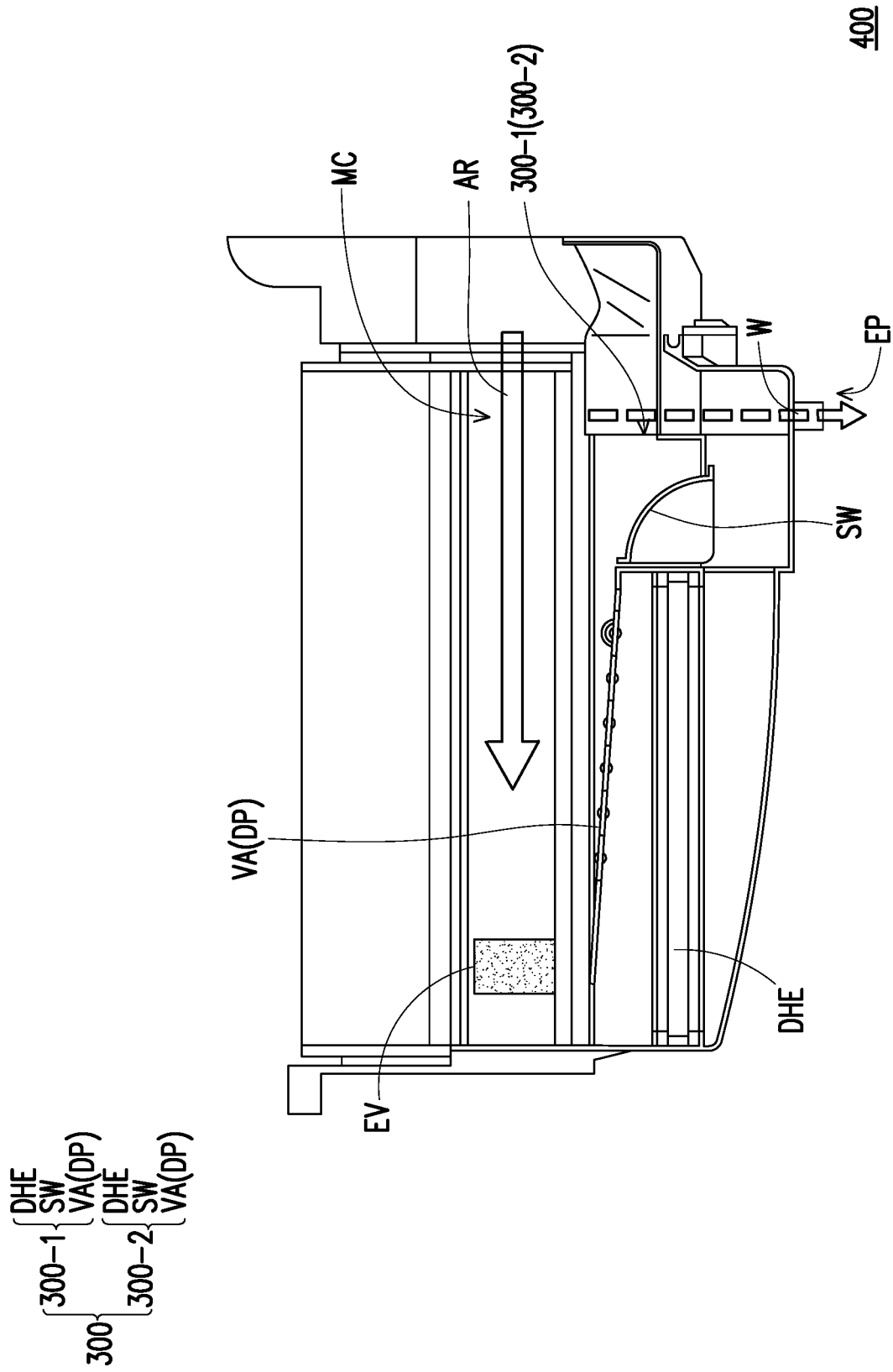
FIG. 12A to FIG. 12C are schematic cross-sectional views of the dehumidification device of FIG. 11A when the vehicle air conditioning system of FIG. 10A is in different operating modes.

For example, when the vehicle air conditioning system 400 cools the air, the dehumidification device 300 does not operate. At this time, as shown in FIG. 12A, in the dehumidification device 300, the air volume adjusting mechanism VA of a first dehumidification device 300-1 and the air volume adjusting mechanism VA of a second dehumidification device 300-2, and the built-in heater of the first dehumidification device 300-1 and the built-in heater of the second dehumidification device 300-2 are all turned off, and the air discharge channels EX of the air path switching mechanism SW of the first dehumidification device 300-1 and the air path switching mechanism SW of the second dehumidification device 300-2 are both switched to the discharge air path EP with the return air path RP closed.

On the other hand, in the embodiment, when the vehicle air conditioning system 400 warms the air, that is, in the warming mode of the vehicle air conditioning system 400, the dehumidification device 300 operates and sequentially switches in turn the sizes of the degrees of opening of the damper structures DP of the air volume adjusting mechanism VA of the first dehumidification device 300-1 and the air volume adjusting mechanism VA of the second dehumidification device 300-2, the opening states of the built-in heater of the first dehumidification device 300-1 and the built-in heater of the second dehumidification device 300-2, and the switching states of the air path switching mechanism SW of the first dehumidification device of 300-1 and the air path switching mechanism SW of the second dehumidification device 300-2 between different paths.

Figure 12B:
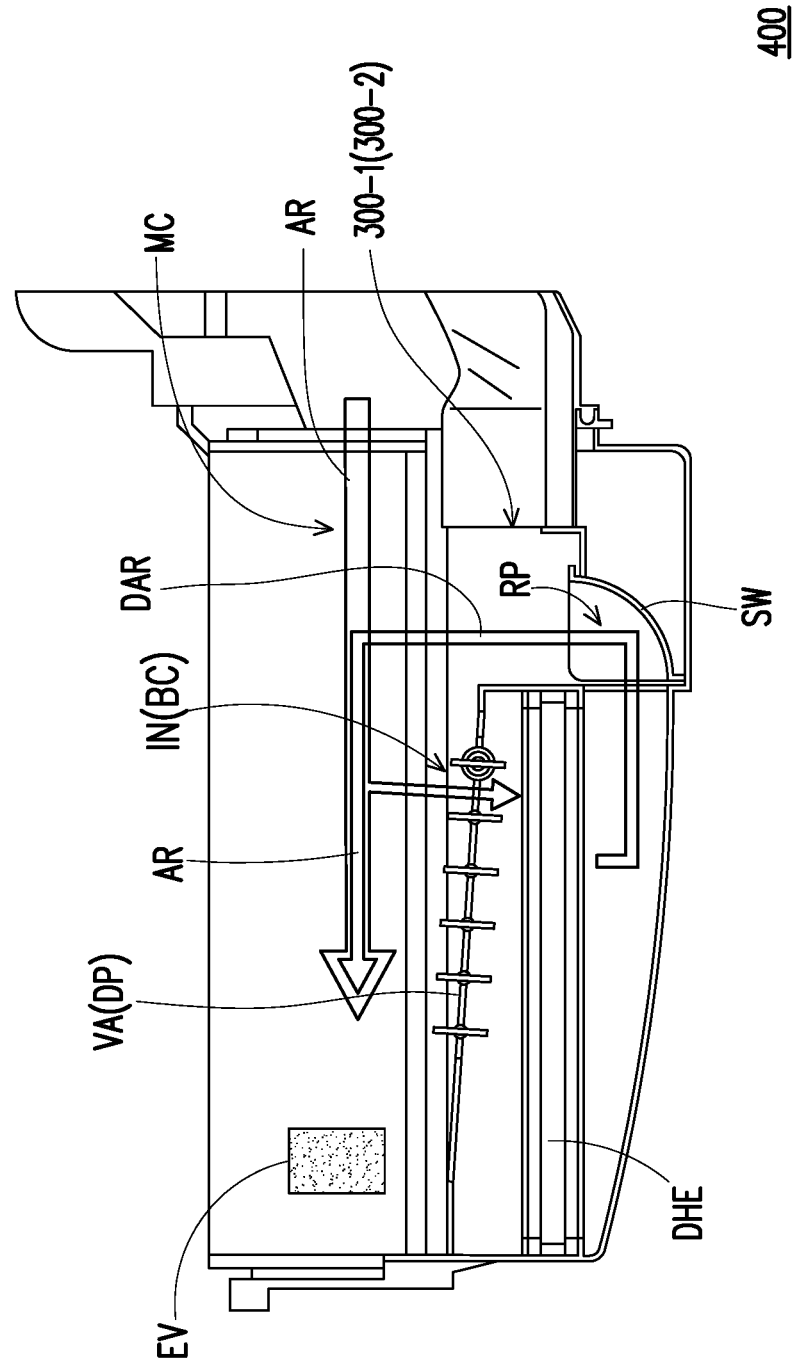
Figure 12C:
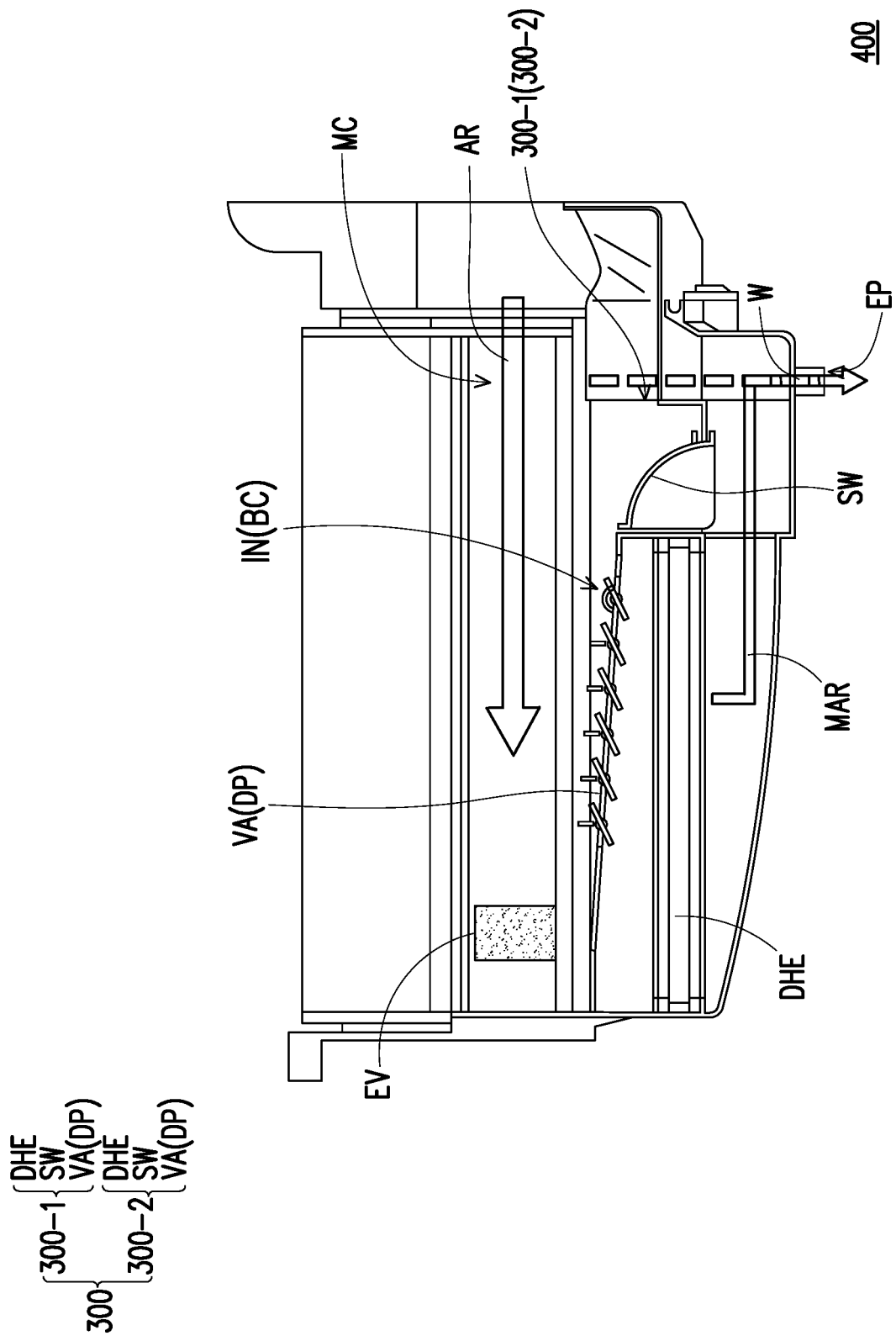

For example, as shown in FIG. 12B and FIG. 12C, in the embodiment, when dehumidification is performed through the first dehumidification device 300-1, as shown in FIG. 12B, the damper structure DP of the air volume adjusting mechanism VA of the first dehumidification device 300-1 is opened, so that the air conditioning air AR passing through the branch flow channel BC flows into the dehumidification device 300 for dehumidification, and the air path switching mechanism SW of the first dehumidification device 300-1 switches the air discharge channel EX of the first dehumidification device 300-1 to the return air path RP of the first dehumidification device 300-1, so that the dried air conditioning air DAR dehumidified by the first dehumidification device 300-1 can return to the main flow channel MC of the air conditioning unit 210. Also, at the same time, the built-in heater of the second dehumidification device 300-2 is also turned on to heat the dehumidification element DHE of the second dehumidification device 300-2, so as to regenerate the second dehumidification device 300-2. At this time, as shown in FIG. 12C, the air path switching mechanism SW of the second dehumidification device 300-2 switches the air discharge channel EX of the second dehumidification device 300-2 to the discharge air path EP of the second dehumidification device 300-2, and the damper structure DP of the air volume adjusting mechanism VA of the second dehumidification device 300-2 is also opened, so that the humidified air MAR generated after heating the second dehumidification device 300-2 can leave the second dehumidification device 300-2 and be discharged to the outside of the vehicle based on the ambient pressure.

Similarly, in the embodiment, when dehumidification is performed through the second dehumidification device 300-2, the damper structure DP of the air volume adjusting mechanism VA of the second dehumidification device 300-2 is also be opened as shown in FIG. 12B, so that the air conditioning air AR passing through the branch flow channel BC flows into the dehumidification device 300 for dehumidification, and the air path switching mechanism SW of the second dehumidification device 300-2 switches the air discharge channel EX of the second dehumidification device 300-2 to the return air path RP of the second dehumidification device 300-2, so that the dried air conditioning air DAR dehumidified by the second dehumidification device 300-2 can return to the main flow channel MC of the air conditioning unit 210. Also, at the same time, the built-in heater of the first dehumidification device 300-1 is also turned on to heat the dehumidification element DHE of the first dehumidification device 300-1, so as to regenerate the first dehumidification device 300-1. At this time, the air path switching mechanism SW of the first dehumidification device 300-1 switches the air discharge channel EX of the first dehumidification device 300-1 to the discharge air path EP of the first dehumidification device 300-1 as shown in FIG. 12C, and the damper structure DP of the air volume adjusting mechanism VA of the first dehumidification device 300-1 is also opened, so that the humidified air MAR generated after heating the second dehumidification device 300-2 can leave the second dehumidification device 300-2 and be discharged to the outside of the vehicle based on the ambient pressure.

Figure 10A:
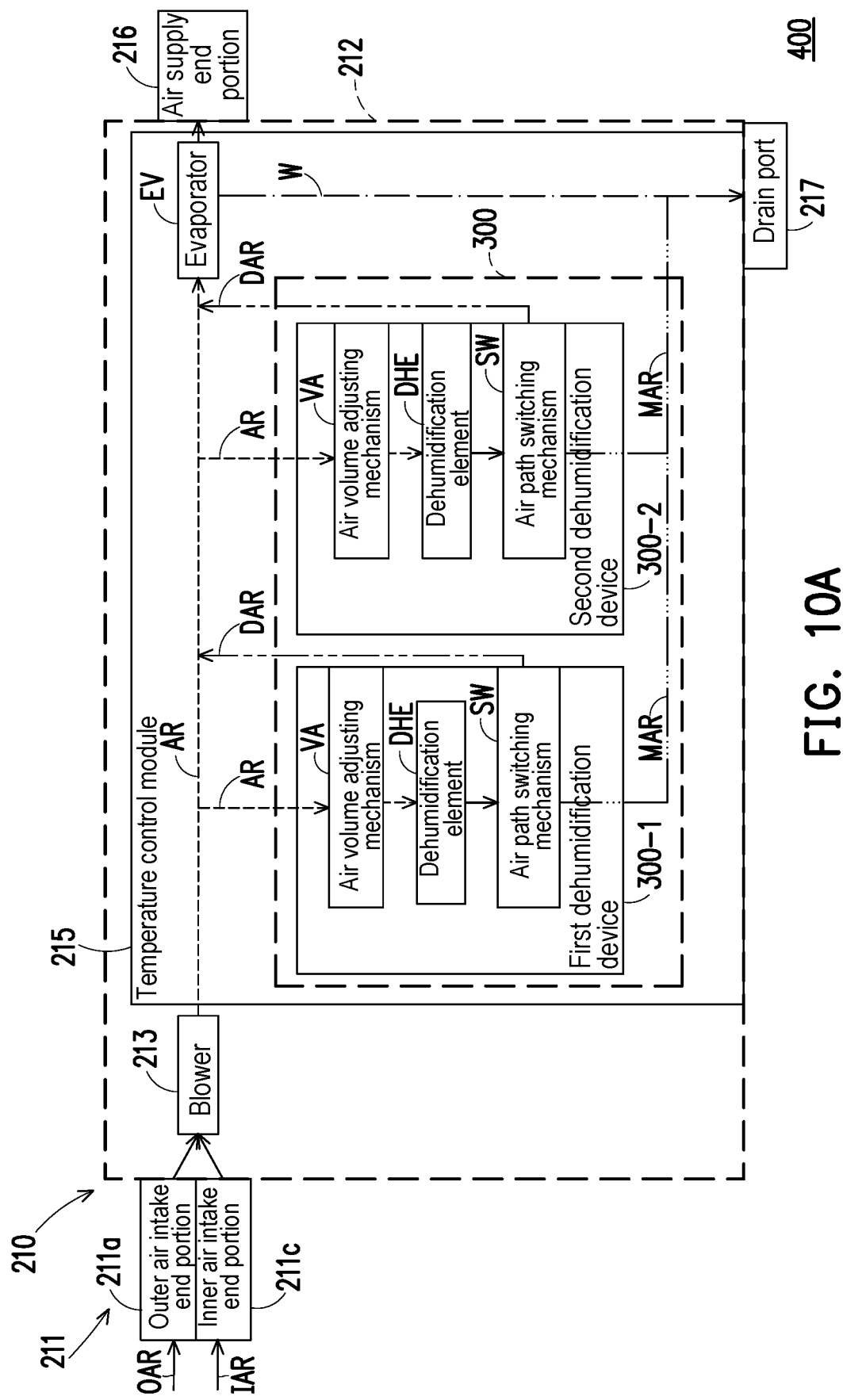
FIG. 10A is a block diagram of a vehicle air conditioning system according to another embodiment of the disclosure.
Figure 10B:
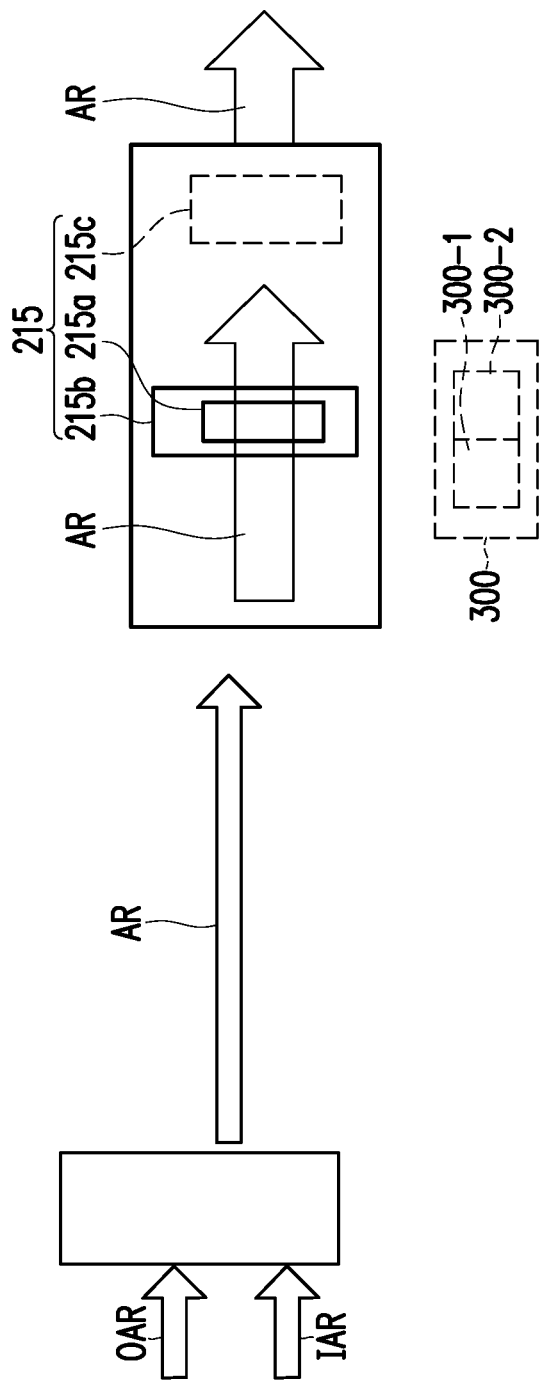
FIG. 10B is a schematic view of an air flow situation of the vehicle air conditioning system of FIG. 10A in a cooling mode.
Figure 10C:
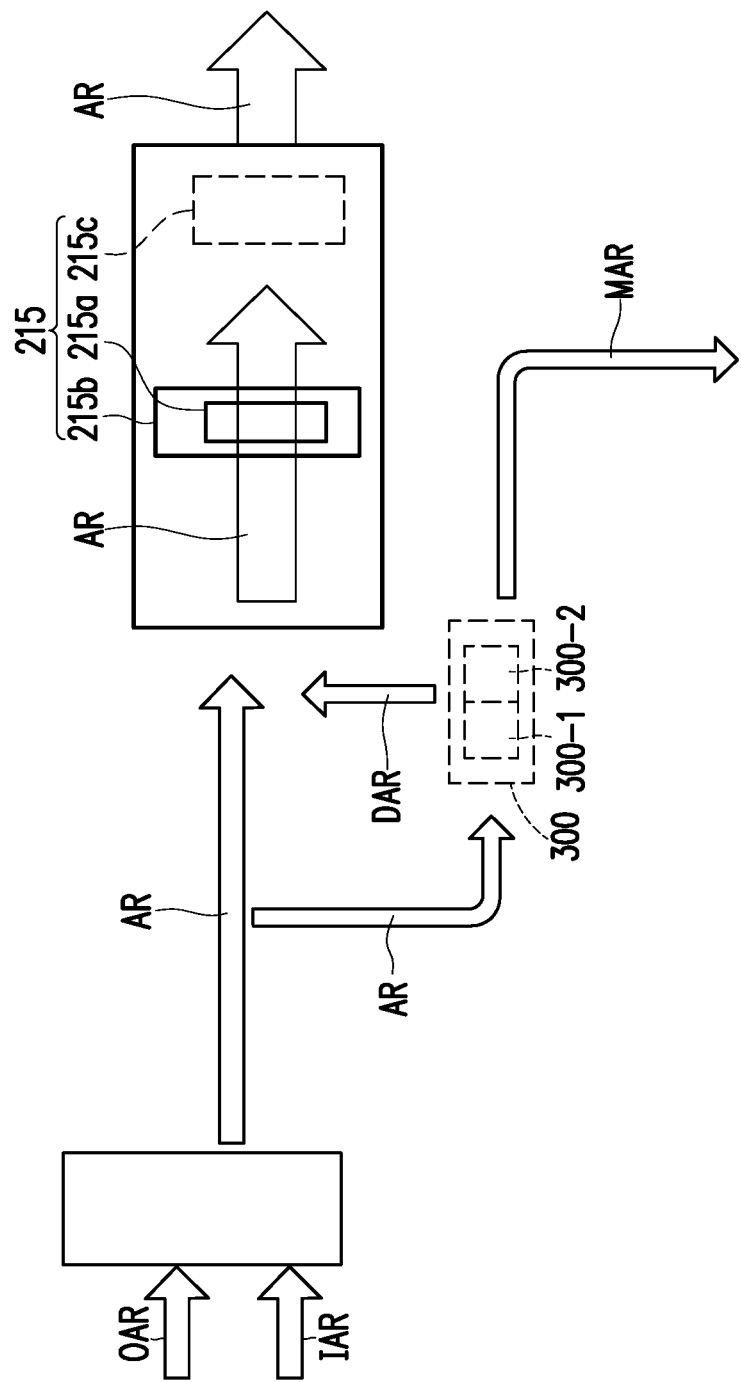
FIG. 10C is a schematic view of an air flow situation of the vehicle air conditioning system of FIG. 10A in a warming mode.

In addition, as shown in FIG. 10A and FIG. 12C, in the embodiment, the heated humidified air MAR may also be discharged out of the vehicle through a drain port 217 of the temperature control module 215 of the air conditioning unit 210 after flowing out of the dehumidification device 300. In this way, the humidified air MAR of the dehumidification device 300 may share the same path and share the drain port 217 with the discharge of condensed water W generated in the evaporator EV during the process of the temperature control module 215 of the air conditioning unit 210 cooling the air without newly providing a hole portion on the body of the vehicle air conditioning system 400, so as to reduce cost and maintain a quiet performance.

Moreover, when the dehumidification device 300 performs dehumidification through any one of the first dehumidification device 300-1 and the second dehumidification device 300-2, since the temperature of the dehumidified dried air conditioning air DAR increases due to adsorption and heat generation, and the dehumidified dried air conditioning air DAR may be transported to the evaporator EV as the heater core within the shortest distance, heat loss during the transportation process can be minimized, thereby reducing the energy consumption of the system.

In this way, the dehumidification device 300 can alternately dehumidify the air conditioning air AR flowing into the dehumidification device 300 through both the first dehumidification device 300-1 and the second dehumidification device 300-2 without interruption, and can also intermittently regenerate the first dehumidification device 300-1 and the second dehumidification device 300-2 respectively, thereby maintaining preferable dehumidification performance all the time. In addition, since the structure of the dehumidification device 300 is similar to the structure of the dehumidification device 100, the dehumidification device 300 can also achieve similar effects and advantages as those of the dehumidification device 100, so details are not repeated here. Moreover, the vehicle air conditioning system 400 of FIG. 10A adopting the dehumidification device 100 can also achieve similar effects and advantages as those of the vehicle air conditioning system 200, so details are also not repeated here.

Figure 11A:
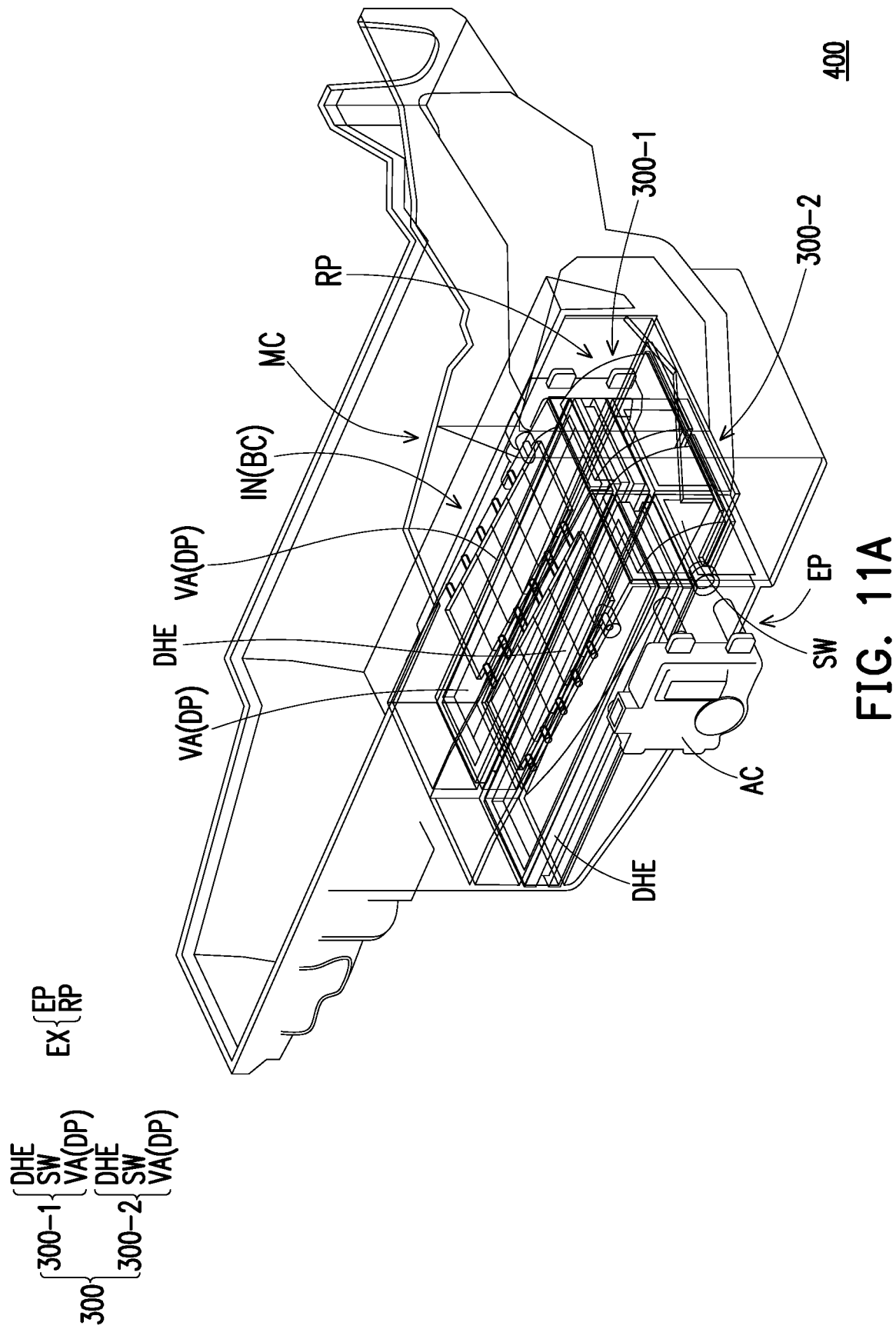
FIG. 11A is a schematic structural view of a dehumidification device of the vehicle air conditioning system of FIG. 10A.
Figure 11B:
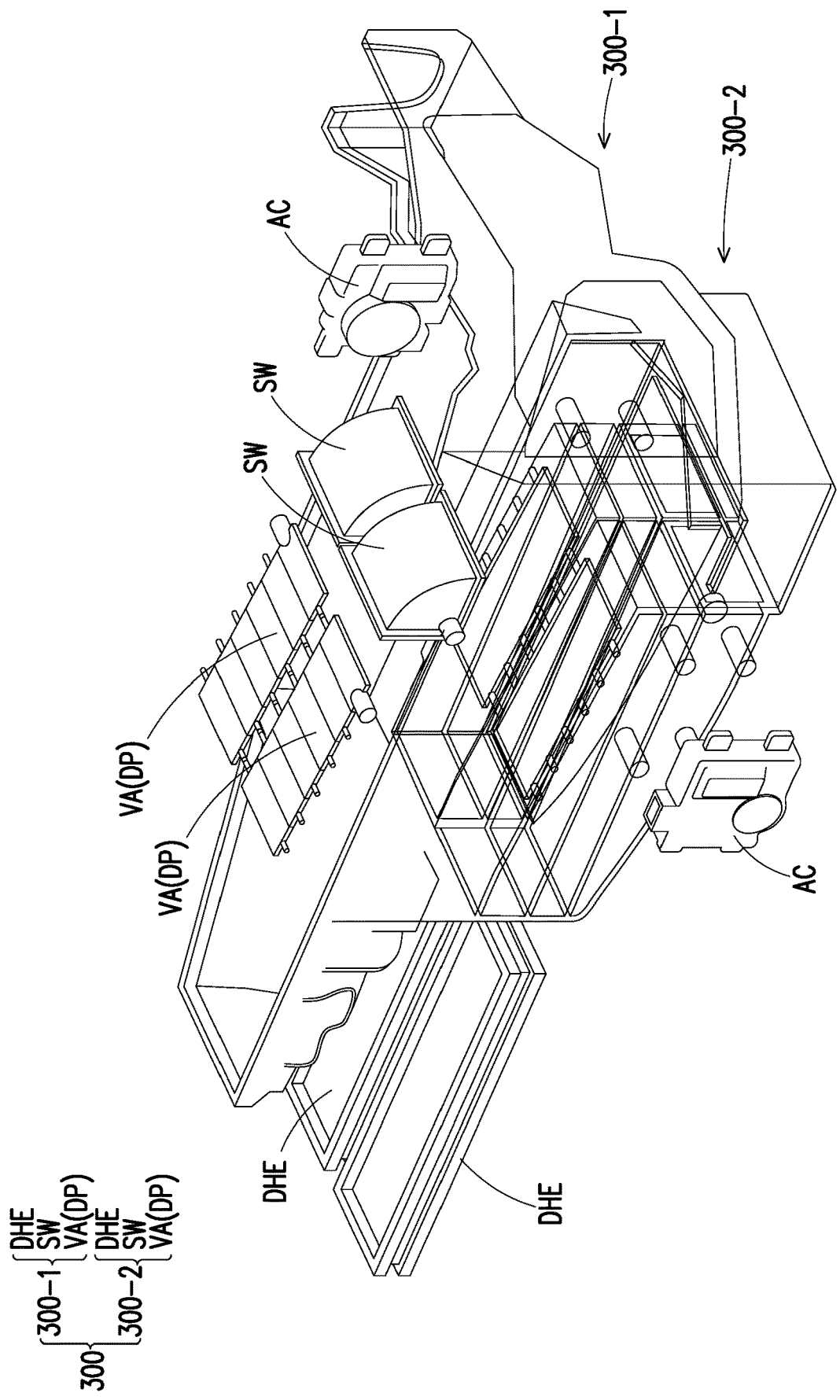
FIG. 11B is an exploded view of the dehumidification device of FIG. 11A.
Figure 13:
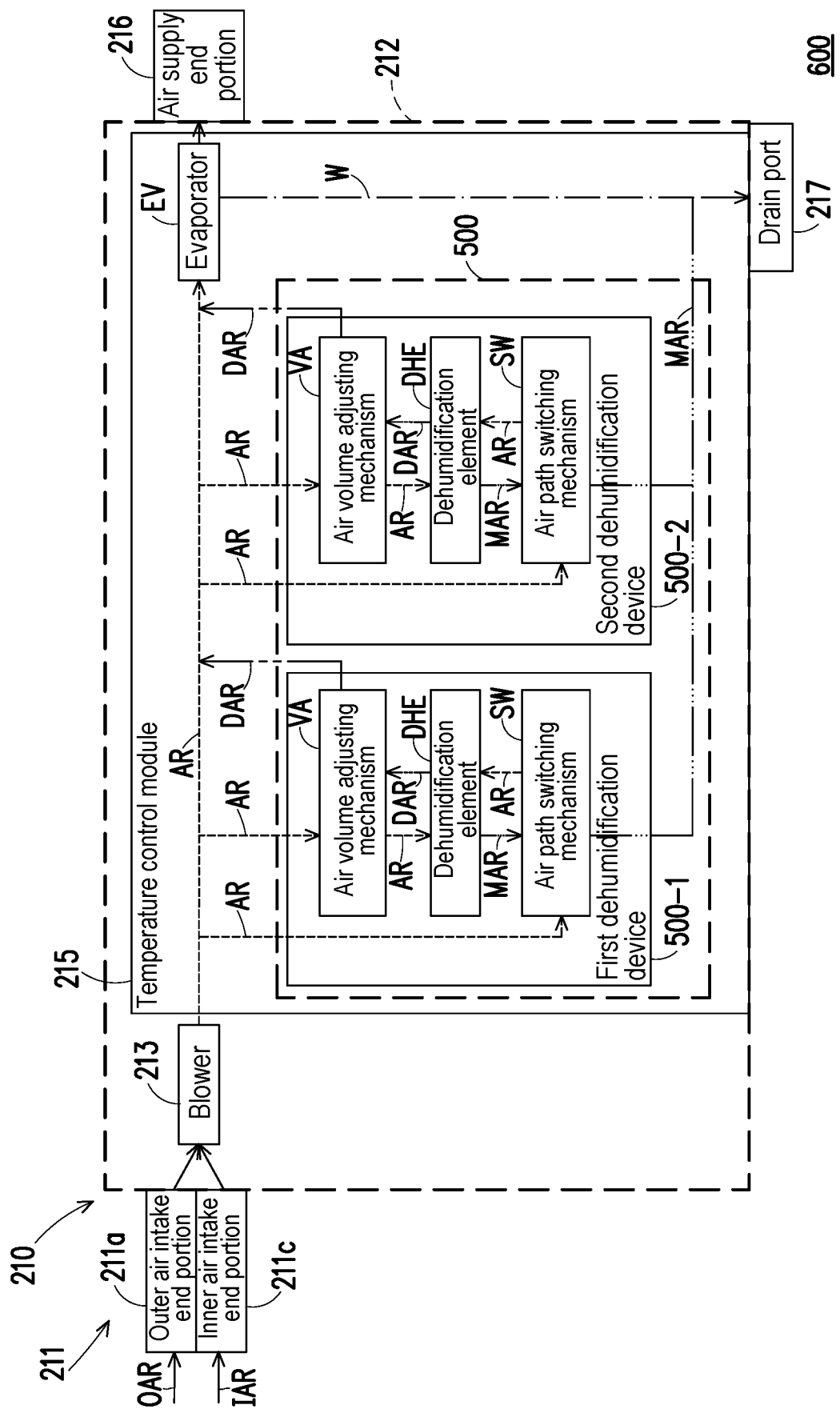
FIG. 13 is a block diagram of a vehicle air conditioning system according to yet another embodiment of the disclosure.
Figure 14A:
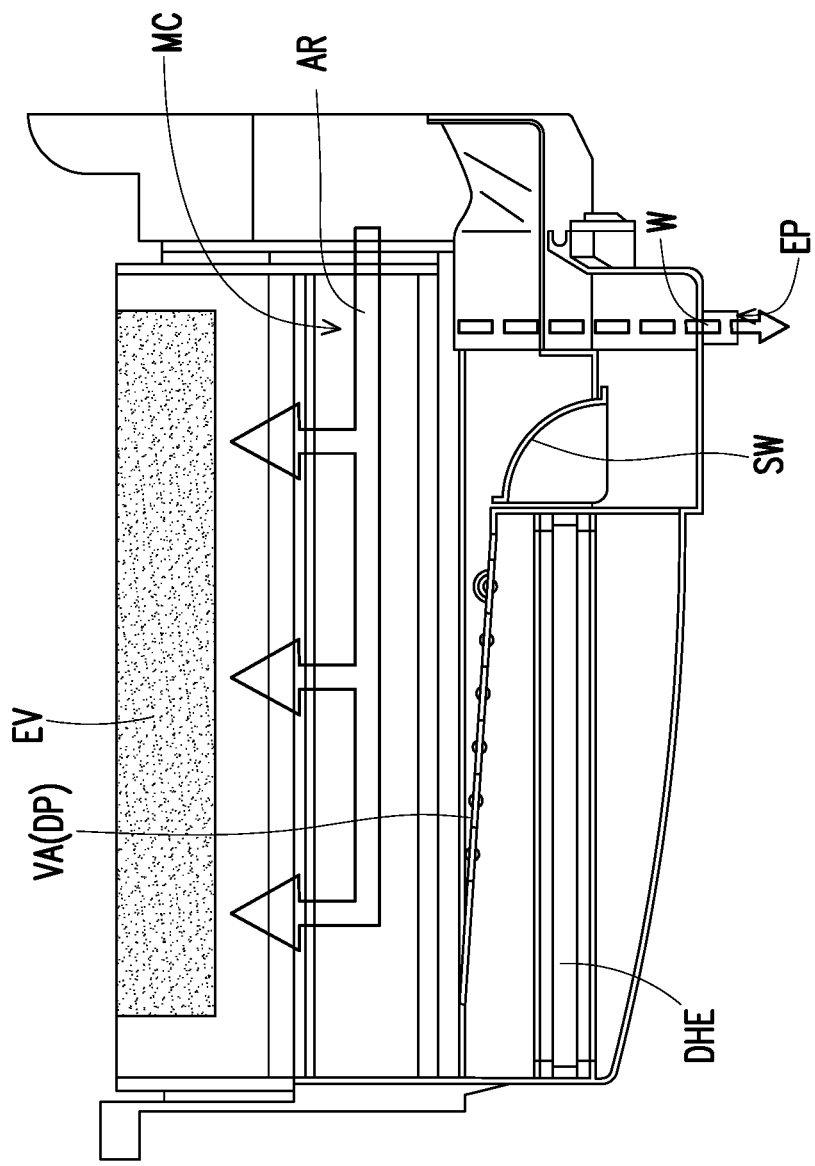
FIG. 14A to FIG. 14C are schematic cross-sectional views of the dehumidification device of FIG. 11A when the vehicle air conditioning system of FIG. 13 is in different operating modes.
Figure 14B:
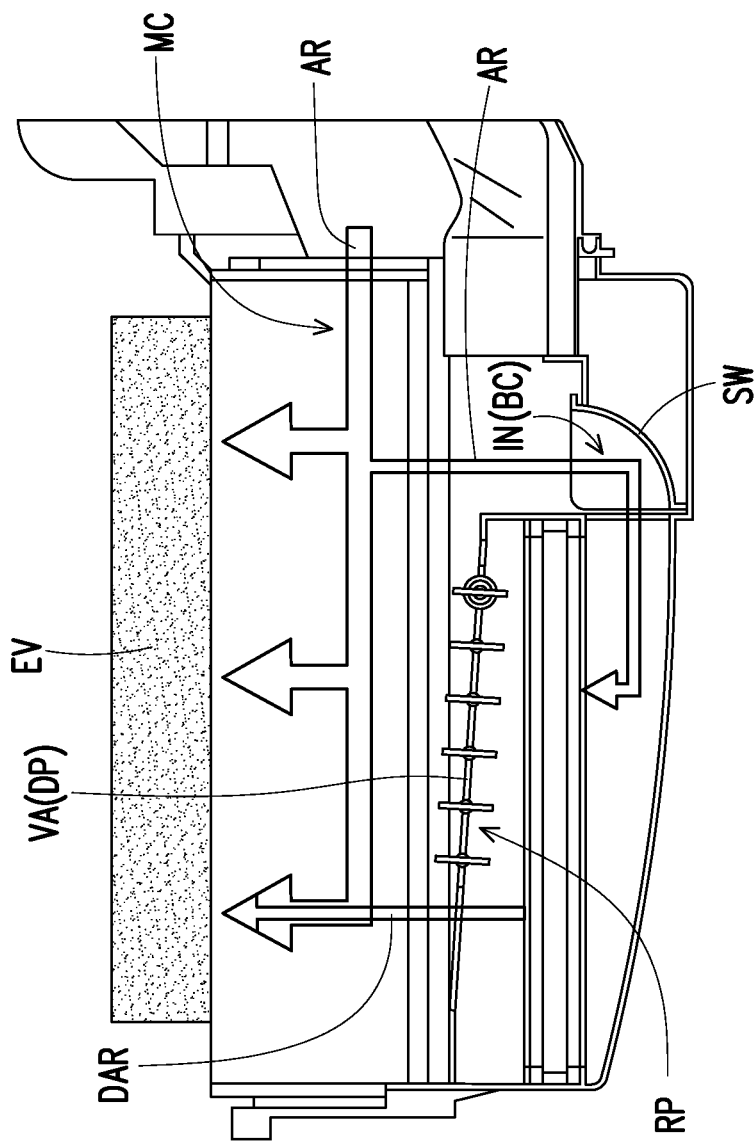
Figure 14C:
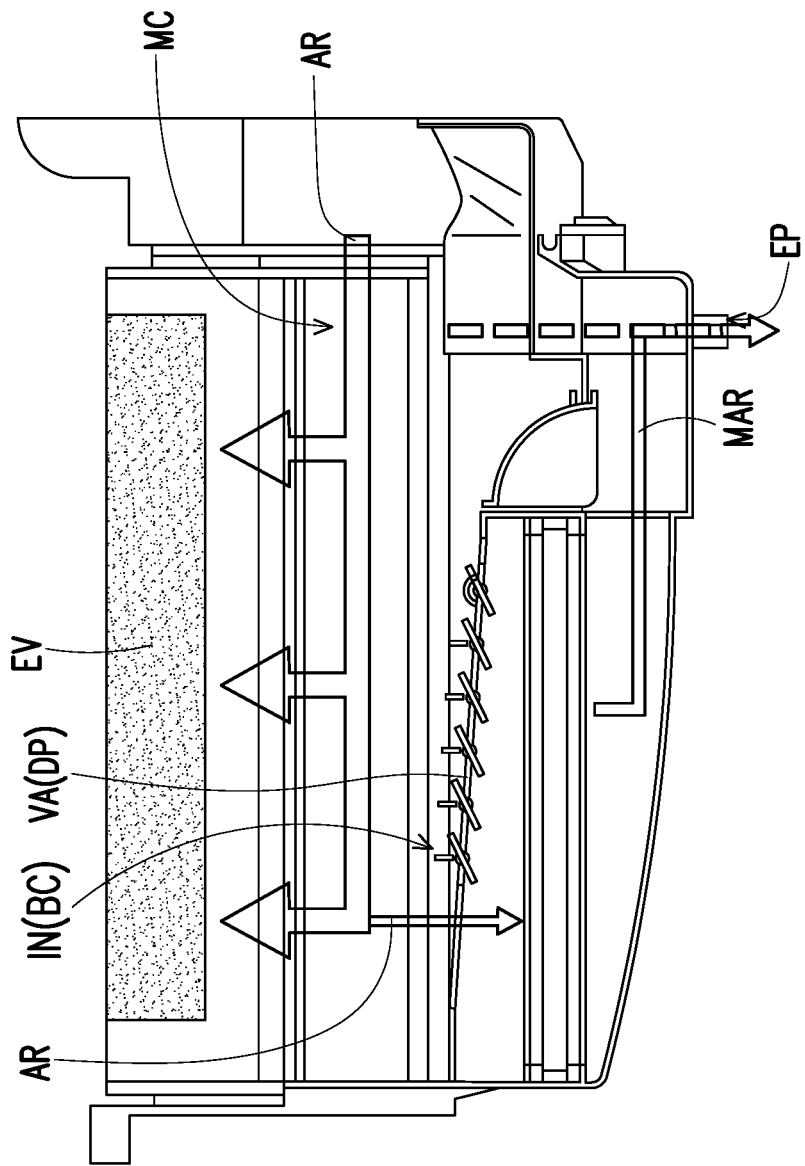

FIG. 13 is a block diagram of a vehicle air conditioning system according to yet another embodiment of the disclosure; and FIG. 14A to FIG. 14C are schematic cross-sectional views of the dehumidification device of FIG. 11A when the vehicle air conditioning system of FIG. 13 is in different operating modes. Please refer to FIG. 13 to FIG. 14C. A vehicle air conditioning system 600 and a dehumidification device 500 are respectively similar to the vehicle air conditioning system 400 and the dehumidification device 300, and the differences between the two are as follows. In the embodiment, the evaporator EV is disposed directly above the dehumidification device 500. Due to ambient wind pressure, when switching the dehumidification process and the regeneration process of the dehumidification device 500, the positions of the air inflow channel IN and the air discharge channel EX change.

Furthermore, as shown in FIG. 13, FIG. 14B, and FIG. 14C, in the embodiment, the air path switching mechanism SW may be used to open and close a communication port of the branch flow path BC, so that a part of the air conditioning air AR flowing in from the blower 213 flows into the air inlet AI of the dehumidification device 500 to switch between the air volume adjusting mechanism VA and the air path switching mechanism SW. As shown in FIG. 14B, when the dehumidification device 500 executes dehumidification, a part of the air conditioning air AR flowing in from the blower 213 flows into the air inlet AI of the dehumidification device 500 as the opening of the air path switching mechanism SW, that is, the air path switching mechanism SW is used to form the air inflow channel IN, and the air volume adjusting mechanism VA is used to form the air discharge channel EX. On the other hand, as shown in FIG. 14C, when the dehumidification device 500 executes regeneration, a part of the air conditioning air AR flowing in from the blower 213 flows into the air inlet AI of the dehumidification device 500 as the opening of the air volume adjusting mechanism VA, that is, the air volume adjusting mechanism VA is used to form the air inflow channel IN, and the air path switching mechanism SW is used to form the air discharge channel EX.

Furthermore, when the vehicle air conditioning system 600 cools the air, the dehumidification device 500 does not operate. At this time, as shown in FIG. 14A, in the dehumidification device 500, the air volume adjusting mechanism VA of a first dehumidification device 500-1 and the air volume adjusting mechanism VA of a second dehumidification device 500-2, and the built-in heater of the first dehumidification device 500-1 and the built-in heater of the second dehumidification device 500-2 are all turned off, and the first dehumidification device 500-1 and the second dehumidification device 500-2 both switch the opening of the air path switching mechanisms SW to be communicated with the drain port 217, so as to close a path for a part of the air conditioning air AR flowing in from the blower 213 to flow into the dehumidification device 500.

On the other hand, in the embodiment, when the vehicle air conditioning system 600 warms the air, that is, in the warming mode of the vehicle air conditioning system 600, the dehumidification device 500 operates and sequentially switches in turn the sizes of the degrees of opening of the damper structures DP of the air volume adjusting mechanism VA of the first dehumidification device 500-1 and the air volume adjusting mechanism VA of the second dehumidification device 500-2, the opening states of the built-in heater of the first dehumidification device 500-1 and the built-in heater of the second dehumidification device 500-2, and the switching states of the air path switching mechanism SW of the first dehumidification device of 500-1 and the air path switching mechanism SW of the second dehumidification device 500-2 between different paths.

For example, as shown in FIG. 14B and FIG. 14C, in the embodiment, when dehumidification is performed through the first dehumidification device 500-1, as shown in FIG. 14B, the first dehumidification device 500-1 enables the opening of the air path switching mechanism SW to be communicated with the branch flow channel BC to form the air inflow channel IN of the first dehumidification device 500-1, and enables the opening to form the air inlet AI of the first dehumidification device 500-1, so that the air conditioning air AR passing through the branch flow channel BC flows into the dehumidification device 500 for dehumidification. Moreover, the damper structure DP of the air volume adjusting mechanism VA of the first dehumidification device 500-1 is also opened, and the dried air conditioning air DAR dehumidified by the first dehumidification device 500-1 returns to the main flow channel MC of the air conditioning unit 210 through the air volume adjusting mechanism VA and is transferred to the evaporator EV, that is, the air volume adjusting mechanism VA of the first dehumidification device 500-1 forms the air discharge channel EX of the first dehumidification device 500-1. Also, at the same time, the built-in heater of the second dehumidification device 500-2 is also turned on to heat the dehumidification element DHE of the second dehumidification device 500-2, so as to regenerate the second dehumidification device 500-2. At this time, as shown in FIG. 12C, the air path switching mechanism SW of the second dehumidification device 500-2 switches the opening of the air path switching mechanism SW to be communicated with the drain port 217, and the damper structure DP of the air volume adjusting mechanism VA of the second dehumidification device 500-2 is also opened, so that the humidified air MAR generated after heating the second dehumidification device 500-2 can leave the second dehumidification device 500-2 and be discharged out of the vehicle based on the ambient pressure, that is, the air volume adjusting mechanism VA of the second dehumidification device 500-2 forms the air inflow channel IN of the second dehumidification device 500-2 at this time, and the air path switching mechanism SW of the second dehumidification device 500-2 forms the air discharge channel EX of the second dehumidification device 500-2.

Similarly, in the embodiment, when dehumidification is performed through the second dehumidification device 500-2, the second dehumidification device 500-2 also enables the opening of the air path switching mechanism SW to be communication with the branch flow channel BC as shown in FIG. 14B to form the air inflow channel IN of the second dehumidification device 500-2, and enables the opening to form the air inlet AI of the second dehumidification device 500-2, so that the air conditioning air AR passing through the branch flow channel BC flows into the dehumidification device 500 for dehumidification. Moreover, the damper structure DP of the air volume adjusting mechanism VA of the second dehumidification device 500-2 is also opened, and the dried air conditioning air DAR dehumidified by the second dehumidification device 500-2 returns to the main flow channel MC of the air conditioning unit 210 through the air volume adjusting mechanism VA and is transferred to the evaporator EV, that is, the air volume adjusting mechanism VA of the second dehumidification device 500-2 forms the air discharge channel EX of the second dehumidification device 500-2. Also, at the same time, the built-in heater of the first dehumidification device 500-1 is also turned on to heat the dehumidification element DHE of the first dehumidification device 500-1, so as to regenerate the first dehumidification device 500-1. At this time, the air path switching mechanism SW of the first dehumidification device 500-1 also switches the opening of the air path switching mechanism SW to be communicated with the drain port 217 as shown in FIG. 14C, and the damper structure DP of the air volume adjusting mechanism VA of the first dehumidification device 500-1 is also opened, so that the humidified air MAR generated after heating the first dehumidification device 500-1 can leave the first dehumidification device 500-1 and be discharged out of the vehicle based on the ambient pressure, that is, the air volume adjusting mechanism VA of the first dehumidification device 500-1 forms the air inflow channel IN of the first dehumidification device 500-1 at this time, and the air path switching mechanism SW of the first dehumidification device 500-1 forms the air discharge channel EX of the first dehumidification device 500-1.

In this way, the dehumidification device 500 can alternately dehumidify the air conditioning air AR flowing into the dehumidification device 500 through both the first dehumidification device 500-1 and the second dehumidification device 500-2 without interruption, and can also intermittently regenerate the first dehumidification device 500-1 and the second dehumidification device 500-2 respectively, thereby maintaining preferable dehumidification performance all the time. Moreover, since the structure of the dehumidification device 500 is similar to the structure of the dehumidification device 300, the dehumidification device 500 can also achieve similar effects and advantages as those of the dehumidification device 300, so details are not repeated here. Moreover, the vehicle air conditioning system 600 of FIG. 13 adopting the dehumidification device 500 can also achieve similar effects and advantages as those of the vehicle air conditioning system 400, so details are also not repeated here.

In summary, in the vehicle air conditioning system of the embodiments of the disclosure, the dehumidification device may be integrated in the vehicle air conditioning system as the humidity adjustment unit through sharing the structures of the blower and the housing with the vehicle air conditioning system, and through sharing the configuration of the air flow channel of the vehicle air conditioning system, increases in ventilation resistance can be suppressed and increases in power consumption of the blower can be suppressed. At the same time, through simplifying necessary components of the vehicle air conditioning system, even lower power consumption can be ensured while suppressing increases in cost. Also, through disposing the dehumidification device on the side of the housing peripheral wall opposite to the air supply port of the blower for connecting the main flow channel in the centrifugal direction and configuring the moisture-absorbing surface of the dehumidification element of the dehumidification device to be parallel to the gravitational direction or facing diagonally below the vehicle front side and inclined relative to the gravitational direction, the impact caused by external water splashing or water droplets staying on the dehumidification element can be prevented, thereby reducing the risk of deterioration of elements of the dehumidification device, so as to have preferable reliability.

Moreover, the dehumidification device can alternately dehumidify the air conditioning air flowing into the dehumidification device through both the first dehumidification device and the second dehumidification device, and can also intermittently regenerate the first dehumidification device and the second dehumidification device respectively, thereby maintaining preferable dehumidification performance all the time.

In addition, through disposing the dehumidification device as the humidity adjustment unit on the connection channel connecting the blower of the air conditioning unit and the temperature control module, the impact on the size of the vehicle air conditioning system when the dehumidification device is installed therein can be minimized through using the dead zone between the blower and the temperature control module.

On the other hand, through disposing the dehumidification device as the humidity adjustment unit in front of the evaporator of the temperature control module, the humidified air of the dehumidification device may share the same path and share the drain port with the discharge of the condensed water generated in the evaporator during the process of the temperature control module of the air conditioning unit cooling the air without newly providing a hole portion on the body of the vehicle air conditioning system, so as to reduce cost and maintain a quiet performance.

Moreover, when the dehumidification device performs dehumidification, since the temperature of the dehumidified dried air conditioning air increases due to adsorption and heat generation, and the dehumidified dried air conditioning air may be transported to the evaporator as the heater core within the shortest distance, heat loss during the transportation process can be minimized, thereby reducing the energy consumption of the system.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A vehicle air conditioning system, comprising:
   an air conditioning unit, configured to adjust a temperature in a vehicle compartment and comprising a blower and a temperature control module; and
   a dehumidification device, configured to adjust a humidity in the vehicle compartment, disposed between the blower and an evaporator of the temperature control module, and enabling a part of air conditioning air flowing in from the blower to flow into the dehumidification device.

2. The vehicle air conditioning system according to claim 1, wherein the air conditioning unit further comprises a main flow channel and a branch flow channel, the main flow channel is communicated with an air intake end portion and an air supply end portion of the air conditioning unit and is used for the air conditioning air flowing in from the blower to flow to the temperature control module, and the branch flow channel diverges from the main flow channel, is communicated with the main flow channel and the dehumidification device, and is used for the part of the air conditioning air flowing in from the blower to flow into the dehumidification device.

3. The vehicle air conditioning system according to claim 2, wherein an air volume of the part of the air conditioning air flowing from the branch flow path into the dehumidification device is less than or equal to an air volume of another part of air conditioning air that does not flow into the dehumidification device in the main flow path.

4. The vehicle air conditioning system according to claim 2, wherein the dehumidification device comprises:
   an air volume adjusting mechanism, used to form one of an air inflow channel and an air discharge channel, wherein the air inflow channel is communicated with the branch flow channel;
   an air path switching mechanism, used to form other one of the air inflow channel and the air discharge channel;
   a dehumidification element, disposed on a flow path of the part of the air conditioning air flowing in from the blower between the air volume adjusting mechanism and the air path switching mechanism.

5. The vehicle air conditioning system according to claim 4, wherein there are a plurality of dehumidification devices, comprising a first dehumidification device and a second dehumidification device, wherein when dehumidification is performed through a dehumidification element of one of the first dehumidification device and the second dehumidification device, other one of the first dehumidification device and the second dehumidification device heats the dehumidification element of the other one to regenerate the other one of the first dehumidification device and the second dehumidification device.

6. The vehicle air conditioning system according to claim 5, wherein the dehumidification device alternately switches a cycle time of dehumidification or regeneration of the first dehumidification device and the second dehumidification device in batches based on information of a temperature and humidity sensor disposed on the air inflow channel or the air discharge channel of at least any one of the first dehumidification device and the second dehumidification device.

7. The vehicle air conditioning system according to claim 5, wherein the first dehumidification device and the second dehumidification device alternately switch to execute a dehumidification or regeneration process at a predetermined time interval.

8. The vehicle air conditioning system according to claim 5, wherein the air volume adjusting mechanism of any one of the first dehumidification device and the second dehumidification device is used to form the air inflow channel, comprises a damper structure configured to adjust a degree of opening, and is used to adjust an air volume of the part of the air conditioning air flowing into the air inflow channel of the any one, the air path switching mechanism is used to form the air discharge channel, and the air path switching mechanism switches the air discharge channel between a return air path and a discharge air path, wherein the return air path is an air path for returning dehumidified dried air conditioning air back to the main flow path of the air conditioning unit, and the discharge air path is an air path for discharging humidified air generated by heating the dehumidification device to an outside of a vehicle,
   when dehumidification is performed through the first dehumidification device, the degree of opening of the damper structure of the first dehumidification device is greater than the degree of opening of the damper structure of the second dehumidification device, the air path switching mechanism of the first dehumidification device switches the air discharge channel of the first dehumidification device to the return air path of the first dehumidification device, and the air path switching mechanism of the second dehumidification device switches the air discharge channel of the second dehumidification device to the discharge air path of the second dehumidification device,
   when dehumidification is performed through the second dehumidification device, the degree of opening of the damper structure of the second dehumidification device is greater than the degree of opening of the damper structure of the first dehumidification device, the air path switching mechanism of the second dehumidification device switches the air discharge channel of the second dehumidification device to the return air path of the second dehumidification device, and the air path switching mechanism of the first dehumidification device switches the air discharge channel of the first dehumidification device to the discharge air path of the first dehumidification device.

9. The vehicle air conditioning system according to claim 5, wherein the air volume adjusting mechanism of any one of the first dehumidification device and the second dehumidification device comprises a damper structure configured to adjust a degree of opening, and the air path switching mechanism is used to open and close a communication port of the branch flow channel, so that a part of air conditioning air flowing in from the blower flows into an air inlet of the dehumidification device to switch between the air volume adjusting mechanism and the air path switching mechanism of the any one, wherein when the first dehumidification device executes dehumidification, the air path switching mechanism of the first dehumidification device is used to form the air inflow channel of the first dehumidification device, the air volume adjusting mechanism of the first dehumidification device is used to form the air discharge channel of the first dehumidification device, the air volume adjusting mechanism of the second dehumidification device is used to form the air inflow channel of the second dehumidification device, the air path switching mechanism of the second dehumidification device is used to form the air discharge channel of the second dehumidification device, and the degree of opening of the damper structure of the first dehumidification device is greater than the degree of opening of the damper structure of the second dehumidification device, when the second dehumidification device executes dehumidification, the air path switching mechanism of the second dehumidification device is used to form the air inflow channel of the second dehumidification device, the air volume adjusting mechanism of the second dehumidification device is used to form the air discharge channel of the second dehumidification device, the air volume adjusting mechanism of the first dehumidification device is used to form the air inflow channel of the first dehumidification device, the air path switching mechanism of the first dehumidification device is used to form the air discharge channel of the first dehumidification device, and the degree of opening of the damper structure of the second dehumidification device is greater than the degree of opening of the damper structure of the first dehumidification device.

10. The vehicle air conditioning system according to claim 2, wherein the dehumidification device is disposed on a connection channel connecting the blower of the air conditioning unit and the temperature control module.

11. The vehicle air conditioning system according to claim 10, wherein an air volume adjusting mechanism is used to form an air inflow channel, an air path switching mechanism is used to form an air discharge channel, and the air path switching mechanism switches the air discharge channel between a return air path and a discharge air path, wherein the return air path is an air path for returning dehumidified dried air conditioning air back to the main flow path of the air conditioning unit, and the discharge air path is an air path for discharging humidified air generated by heating the dehumidification device to an outside of a vehicle.

12. The vehicle air conditioning system according to claim 10, wherein the connection channel is formed as a part of the main flow channel, the branch flow channel is communicated with the connection channel, the air volume adjusting mechanism comprises a damper structure configured to adjust a degree of opening, the degree of opening of the damper structure is used to form and adjust a size of an adjustable cross-sectional area of an inflow pathway of the branch flow channel, and the adjustable cross-sectional area of the inflow pathway of the branch flow channel is less than or equal to half of a cross-sectional area of the connection channel.

13. The vehicle air conditioning system according to claim 10, wherein the dehumidification device installed in the connection channel is installed on a side of a housing peripheral wall opposite to an air supply port of the blower for connecting the main flow channel in a centrifugal direction.

14. The vehicle air conditioning system according to claim 10, wherein the dehumidification element has a moisture-absorbing surface, and the moisture-absorbing surface is disposed parallel to a gravitational direction and perpendicular to a front side direction of a vehicle.

15. The vehicle air conditioning system according to claim 10, wherein the dehumidification element has a moisture-absorbing surface, the moisture-absorbing surface is disposed to be inclined relative to a gravitational direction and a front side direction of a vehicle, and the moisture-absorbing surface faces diagonally below a vehicle front side.

16. The vehicle air conditioning system according to claim 10, wherein the air volume adjusting mechanism and the air path switching mechanism both comprise a damper structure configured to adjust a degree of opening, and the dehumidification device further comprises:

an actuator; and a connection mechanism, wherein the actuator connects the air volume adjusting mechanism and the air path switching mechanism through connection mechanism to control the degrees of opening of the damper structures of the air volume adjusting mechanism and the air path switching mechanism.

17. The vehicle air conditioning system according to claim 16, wherein the degrees of opening of the damper structures of the air volume adjusting mechanism and the air path switching mechanism are linked through the connection mechanism.

18. The vehicle air conditioning system according to claim 10, further comprising:

a partition, disposed in the main flow channel and used to divert the part of the air conditioning air in the main flow channel to the branch flow channel.

19. The vehicle air conditioning system according to claim 18, wherein the partition faces an air inlet of the dehumidification device, and the partition extends from an end of the air inlet of the dehumidification device to other end of the air inlet of the dehumidification device.

20. The vehicle air conditioning system according to claim 18, wherein the partition faces an air inlet and an exhaust port of the dehumidification device, and the partition extends from an end of the air inlet of the dehumidification device to an end of the exhaust port of the dehumidification device away from the air inlet.

21. The vehicle air conditioning system according to claim 18, wherein the partition faces an air inlet and an exhaust port of the dehumidification device, and the partition extends from an upstream side of an air supply port of the blower for connecting the main flow channel to an end of the exhaust port of the dehumidification device away from the air inlet.

22. The vehicle air conditioning system according to claim 10, further comprising:

a windproof plate, disposed in the main flow channel and connected to a partition, and used to separate an air inflow channel and an air discharge channel.

23. The vehicle air conditioning system according to claim 10, further comprising:

a main flow air volume distribution mechanism, disposed in the main flow channel and used to control an air volume of air conditioning air in the main flow channel.

24. The vehicle air conditioning system according to claim 23, wherein the main flow air volume distribution mechanism is located on a connection portion of an air supply port of the blower for connecting the main flow channel and the connection channel, and extends toward an upstream side of the air supply port of the blower.

25. The vehicle air conditioning system according to claim 23, wherein the main flow air volume distribution mechanism is located on a flow path of dehumidified dried air conditioning air flowing from an exhaust port of the dehumidification device to the temperature control module, and the dehumidified air conditioning air merges with another part of air conditioning air that does not flow into the dehumidification device in the main flow channel after passing through the main flow air volume distribution mechanism.

26. The vehicle air conditioning system according to claim 2, wherein the dehumidification device is disposed in front of the evaporator and is configured in the temperature control module.

27. The vehicle air conditioning system according to claim 26, wherein the air conditioning unit has a drain port for discharging condensed water generated in the evaporator to an outside of a vehicle, and heated humidified air in the dehumidification device is discharged out of the vehicle through the drain port and shares a same path with a discharge of the condensed water generated in the evaporator.

28. The vehicle air conditioning system according to claim 26, wherein an air volume adjusting mechanism is used to form an air inflow channel, an air path switching mechanism is used to form an air discharge channel, and the air path switching mechanism switches the air discharge channel between a return air path and a discharge air path, wherein the return air path is an air path for returning dehumidified dried air conditioning air back to the main flow path of the air conditioning unit, and the discharge air path is an air path for discharging humidified air generated by heating the dehumidification device to an outside of a vehicle.

29. The vehicle air conditioning system according to claim 26, wherein an air path switching mechanism is used to open and close a communication port of the branch flow path, so that a part of air conditioning air flowing in from the blower flows into an air inlet of the dehumidification device to switch between an air volume adjusting mechanism and an air path switching mechanism, wherein when the dehumidification device executes dehumidification, the air path switching mechanism is used to form an air inflow channel, and the air volume adjusting mechanism is used to form an air discharge channel, and when the dehumidification device executes regeneration, the air volume adjusting mechanism is used to form the air inflow channel, and the air path switching mechanism is used to form the air discharge channel.

30. The vehicle air conditioning system according to claim 1, wherein the dehumidification device has a built-in heater configured to directly heat through energization.

* * * * *